United States Patent [19]
Wilhelm et al.

[11] Patent Number: 5,671,288
[45] Date of Patent: Sep. 23, 1997

[54] METHOD AND APPARATUS FOR ASSESSING SLIDE AND SPECIMEN PREPARATION QUALITY

[75] Inventors: Paul S. Wilhelm, Kirkland; Shih-Jong J. Lee, Bellevue, both of Wash.

[73] Assignee: NeoPath, Inc., Redmond, Wash.

[21] Appl. No.: 455,182

[22] Filed: May 31, 1995

[51] Int. Cl.$^6$ .................................................. G06K 9/00
[52] U.S. Cl. .......................... 382/128; 348/127; 427/2.11
[58] Field of Search .................................. 382/128, 133, 382/134, 286, 289, 291, 255; 395/924; 348/125, 127, 128; 356/36, 37, 38, 39, 244; 364/413.08, 413.13; 209/522, 526, 528; 427/2.11

[56] References Cited

U.S. PATENT DOCUMENTS

| | | | |
|---|---|---|---|
| 3,824,393 | 7/1974 | Brain | 356/39 |
| 4,034,342 | 7/1977 | Kruklitis | 340/146.3 AG |
| 4,085,006 | 4/1978 | Mindick et al. | 195/103.7 |
| 4,175,860 | 11/1979 | Bacus | 356/39 |
| 4,667,335 | 5/1987 | Deindoerfer | 377/10 |
| 4,702,595 | 10/1987 | Mutschler et al. | 356/39 |
| 4,812,412 | 3/1989 | Turner | 436/15 |
| 4,839,194 | 6/1989 | Malluche et al. | 427/2 |
| 4,965,725 | 10/1990 | Rutenberg | 364/413.1 |
| 5,029,226 | 7/1991 | Klein et al. | 382/50 |
| 5,051,901 | 9/1991 | Endo | 364/413.11 |
| 5,072,382 | 12/1991 | Kamentsky | 364/413.08 |
| 5,139,031 | 8/1992 | Guirguis | 128/771 |
| 5,257,182 | 10/1993 | Luck et al. | 364/413.1 |
| 5,287,272 | 2/1994 | Rutenberg et al. | 364/413.1 |
| 5,315,700 | 5/1994 | Johnston et al. | 395/163 |
| 5,357,977 | 10/1994 | Michels | 128/758 |
| 5,361,140 | 11/1994 | Hayenga et al. | 358/446 |
| 5,449,622 | 9/1995 | Yabe et al. | 436/63 |

FOREIGN PATENT DOCUMENTS

| | | | |
|---|---|---|---|
| 83/00931 | 3/1983 | WIPO | 356/244 |

OTHER PUBLICATIONS

Bacus, James W. and Les J. Grace, "Optical Microscope System For Standardized Cell Measurements and Analyses", *Applied Optics*, 26:16, pp. 3280–3293, 15 Aug. 1987.

Bartels, Peter H., et al., "A Self-Learning Computer Program for Cell Recognition", *ACTA Cytologica: The Journal of Clinical Cytology*, 14:8, pp. 486–494, Oct. 1970.

(List continued on next page.)

*Primary Examiner*—Andrew Johns
*Attorney, Agent, or Firm*—Hans I. Sun; Emil Moffa

[57] ABSTRACT

An automated biological specimen screener reports an assessment of slide and specimen preparation and quality. The automated biological specimen screener measures, parameters which reflect slide physical characteristics, specimen collection quality, and specimen preparation quality. The automated system reports an objective measure and uses a consistent standard of evaluation. The automated system evaluates characteristics of a slide set from a clinic. The automated system makes a determination of whether these characteristics are within a training capability of a given automated biological screener. Additionally, rather than periodic reviews, slides successfully scanned by the automated system may be used as part of a specimen preparation assessment.

54 Claims, 15 Drawing Sheets

OTHER PUBLICATIONS

Tanaka, Noboru, et al., "Automated Cytologic Screening System (CYBEST Model 4) : an Integrated Image Cytometry System", Reprinted from *Applied Optics*, vol. 26, No. 16, pp. 3301–3307, Aug. 15, 1987. Copyright© 1987 by the Optical Society of America and reprinted by permission of the copyright owner.

Duda, Richard O. and Peter E. Hart, "Fisher's Linear Discriminant", *Patent Classification and Scene Analysis*, Copyright ©1973, pp. 114–119.

Dytch, Harvey E. et al., "An Interactive Microcomputer-Based System for the Quantitative Analysis of Stratified Tissue Sections", *Analytical and Quantitative Cyctology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

Kurman, Robert J. et al., "Part 1: Specimen Adequacy and Part 2: Descriptive Diagnoses", *The Bethesda System for Reporting Cervical/Vaginal Cytologic Diagnoses*, ©1994 Springer–Verlag, pp. 1–81.

Smith, Warren J., "Modern Optical Engineering: The Design of Optical Systems", Copyright ©1966 by McGraw–Hill Book Company, pp. 308–325.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1561, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Patten, Jr., Stanley, "Diagnostic Cytopathology of the Uterine Cervix", Basel, Switzerland, Publisher: S. Karger, 1969, 2nd Edition 1978, Third volume in *Monographs in Clinical Cytology*, edited by G.L. Wied, pp. 10–15.

Patten, Jr., Stanley, "Diagnostic Cytopathology of the Uterine Cervix", Basel, Switzerland, Publisher: S. Karger, 1969, 2nd Edition 1978, Third vol. in *Monographs in Clinical Cytology*, edited by G.L. Wied, pp. 1–9.

Patten, Jr., Stanley, "The Automation of Uterine Cancer Cytology", *Sensitivity and Specificity of Routine Diagnostic Cytology*, Tutorials of Cytology, Chicago, IL, 1976, edited by Wied, Bahr and Bartels, pp. 406–419.

Lundsteen, C., et al., Abstract from *Clin Genet.*, Department of Obstetrics and Gynecology, Rigshospitalet, Copenhagen, Denmark, vol. 45, No. 2, Feb. 1994, pp. 62–66.

Kaplow, L.S., Abstract from *Histochem Cytochem.*, vol. 25, No. 8, Aug. 1977, pp. 990–1000.

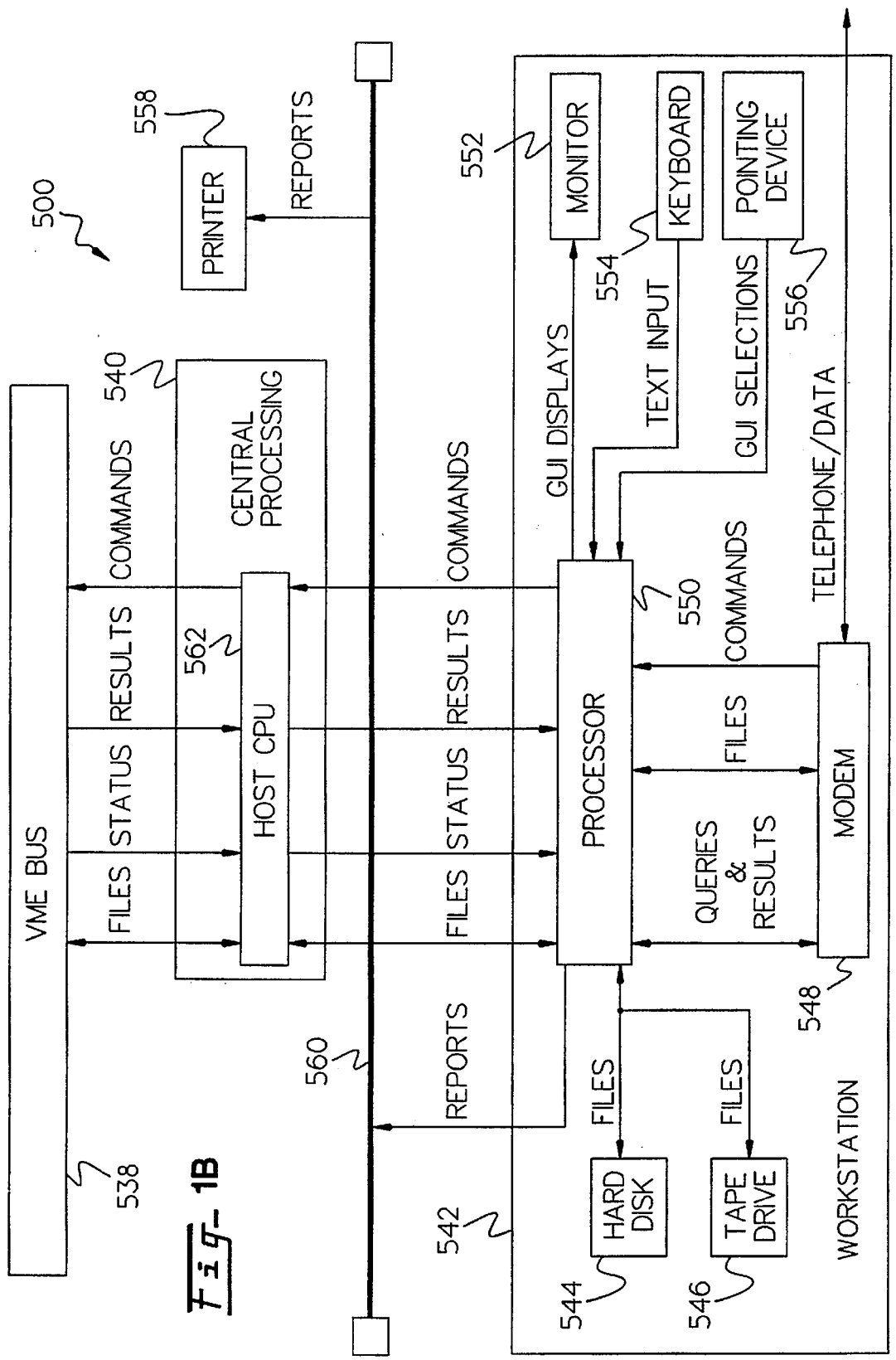

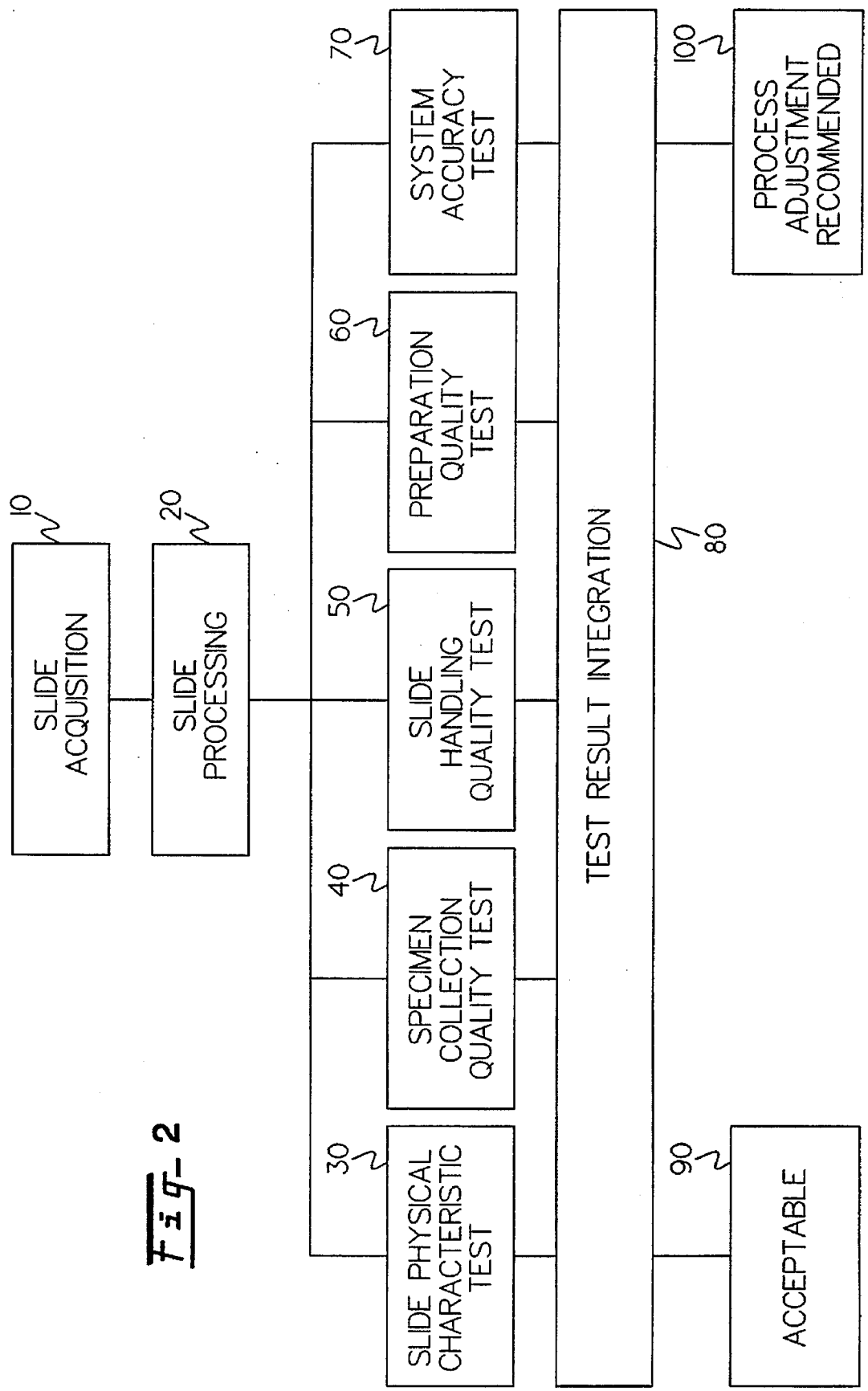

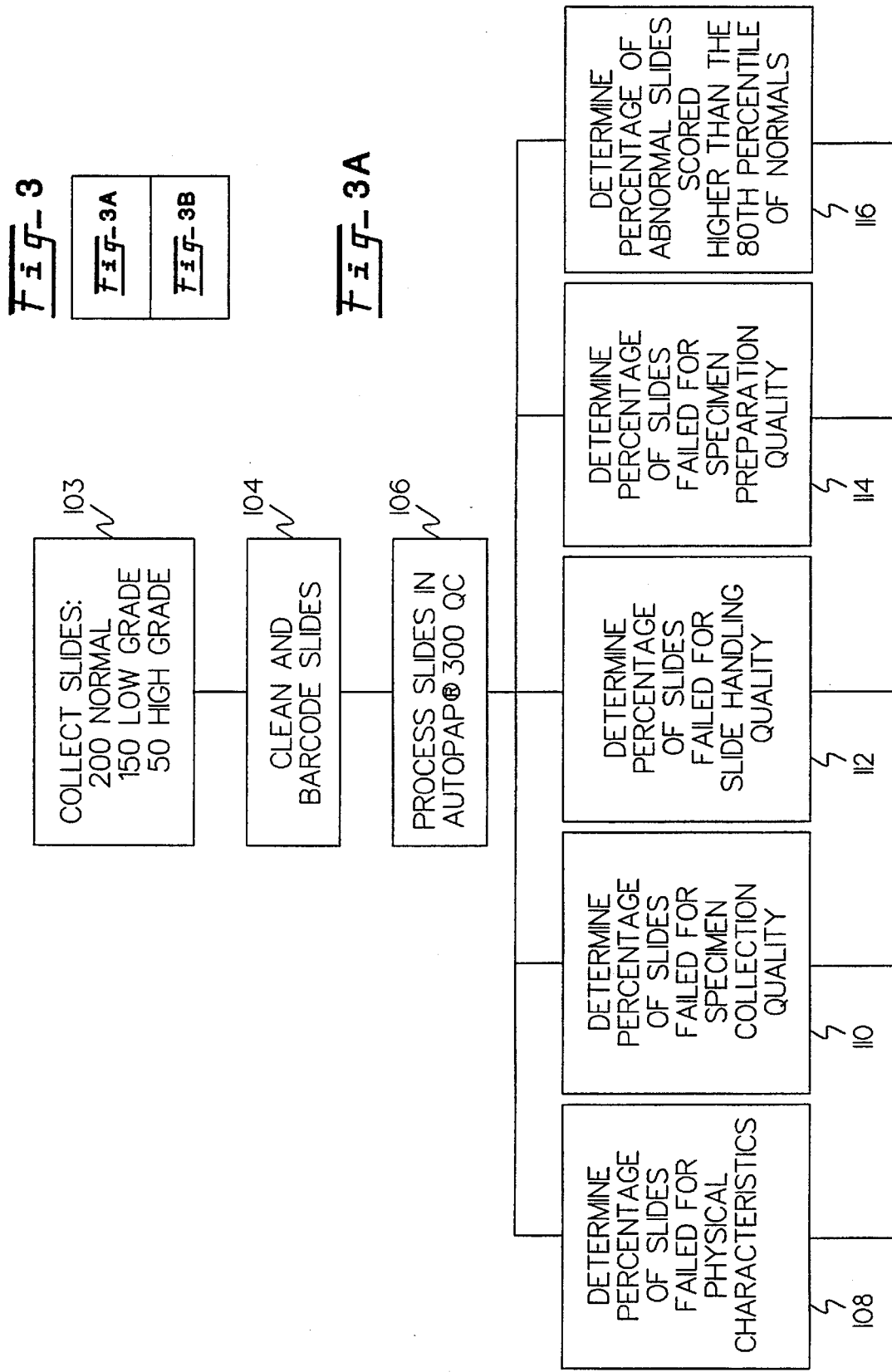

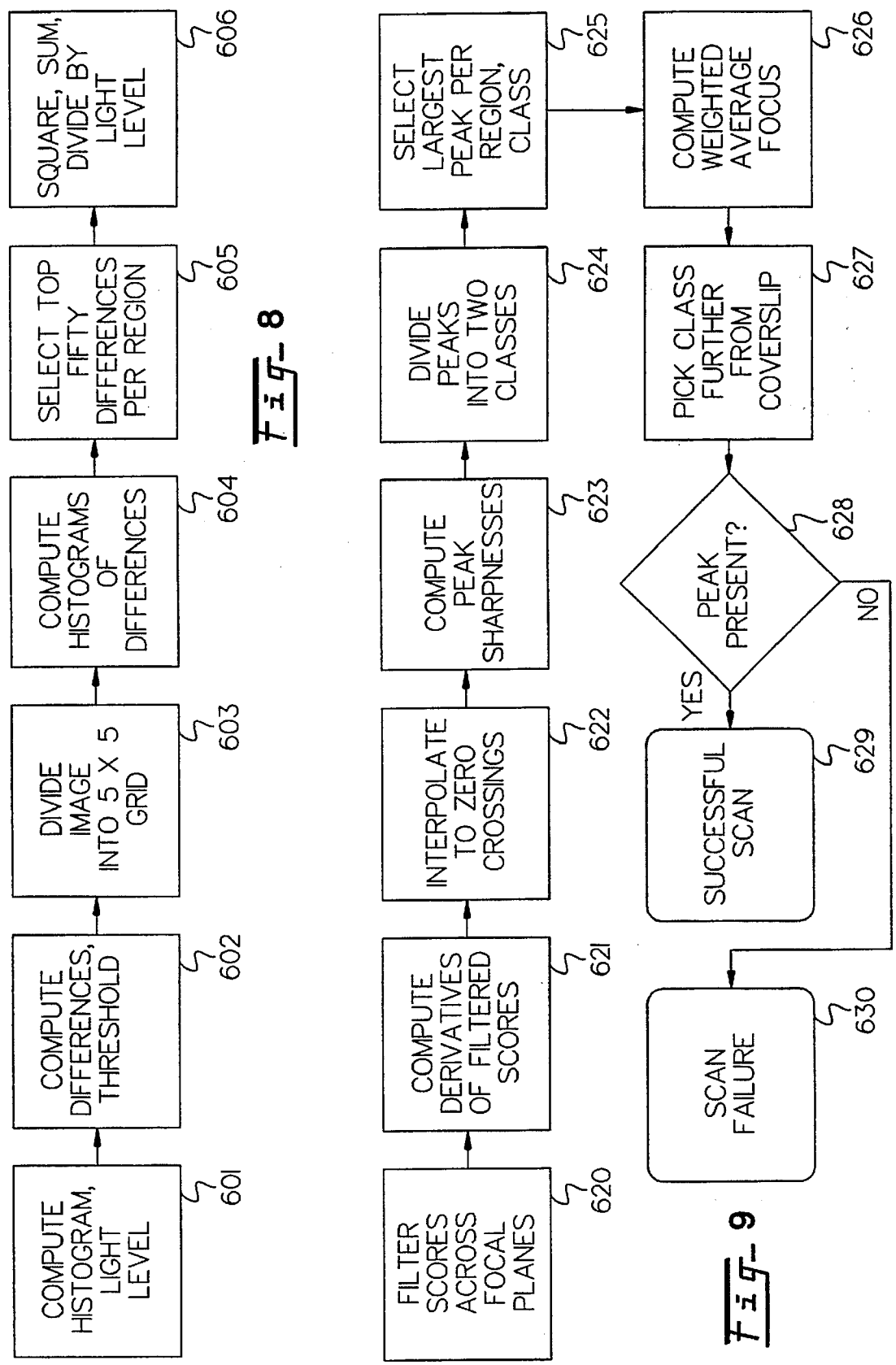

|  | Fig-12A | Fig-12B | Fig-12C | Fig-12D |
|---|---|---|---|---|
| IMAGE | 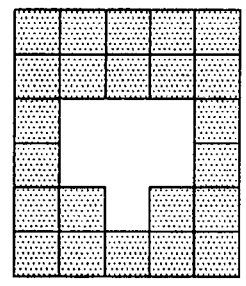 | | | |
| ELEMENT | | | 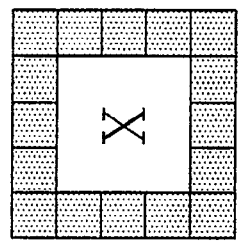 | |
| OPERATION | EROSION | DILATION | EROSION | DILATION |
| RESULT | | 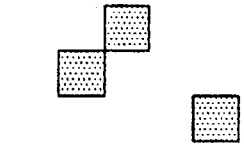 |  | 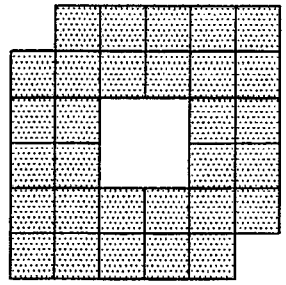 |
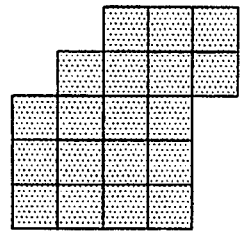

METHOD AND APPARATUS FOR ASSESSING SLIDE AND SPECIMEN PREPARATION QUALITY

This invention relates to a method and apparatus for assessing slide and specimen preparation quality, and more particularly to an automated assessor for a population of biological specimens fixed and stained on slides.

BACKGROUND OF THE INVENTION

Detection of disease processes for which a specimen is taken may not be possible if specimen preparations such as fixation or staining are improper or inconsistent. As a result, there is a need to provide biological specimens having at least a minimum quality level to ensure a higher efficacy of disease screening. A method for assessment of specimen preparation ensures that specimens are prepared using the technique and material that provides for a selected level of quality to allow detection of disease processes of interest.

Furthermore, any such assessment may further determine whether prepared specimens are suitable for computer examination. The assessment may be adjusted to fit requirements for a selected automated system. Moreover, the assessment may include information about the specimen preparation and physical characteristics requiring improvement.

Specimen preparations affect specimen characteristics including morphological detail of cells. Morphologic detail of the cells in biological specimens must remain intact and be made visible for visual or computer examinations of biological specimens to be effective. Cell fixation immobilizes cellular structure. Staining makes the fixed cellular structures visible. Improper fixing of samples allows cell morphology to change and degenerate. Improper staining may obscure cellular detail or may not make cellular structure visible. The assessment should determine whether specimen preparation is conducted in such a manner as to provide good fixation and staining of cells for visual examination or analysis by automated devices. See, for example, the introduction to "Diagnostic Cytopathology of the Uterine Cervix," pp. 1–9, by S. Patten, and "Sensitivity and Specificity of Routine Diagnostic Cytology," by S. Patten in "The Automation of Uterine Cancer Cytology," pp. 406–415, edited by Wied, Bahr, and Bartels. Currently, specimen preparation is evaluated periodically by human visual review.

As described in the above references, specimen collection or sampling is another characteristic which has a strong impact on diagnostic viability of a specimen. If the sample was taken in the wrong anatomical location or sampled with poor technique, the proper spectrum of cell types may not be present. The assessment should determine whether specimen collection provides a good sample of cells for examination.

Physical characteristics of slides are important for automated examination of biological specimens. Physical characteristics such as thickness of a slide, alignment of a coverslip or marking of a slide must be within predetermined parameters for effective imaging and computer examination. These qualities include the quality and sufficiency of the sample obtained. The present invention provides, for the first time, a practical objective method and apparatus for measuring these qualities.

It is therefore a motivation of the invention to provide a method and apparatus to provide objective measures of specimen staining and fixation, specimen collection quality, and slide physical characteristics.

SUMMARY OF THE INVENTION

The invention provides a method and apparatus for the assessment of slide characteristics and specimen preparation quality. The method and apparatus of the invention comprises an image analysis system that further comprises an image gathering system having a camera, a motion controller, an illumination system, and an image transfer interface. The image gathering system is constructed for gathering image data of a specimen mounted on a slide. The image gathering system is coupled to a data processing system to transfer image data from the image gathering system to the data processing system. The data processing system implements a multiple step process. A first step comprises slide physical characteristic assessment. A second step comprises specimen collection quality assessment. A third step comprises slide handling quality assessment. A fourth step comprises specimen preparation quality assessment. A fifth step comprises specimen analysis accuracy assessment.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B and 1C show one embodiment of the invention.

FIG. 2 shows a flow chart of the method for assessing slide and specimen preparation quality of the invention.

FIGS. 8 and 9 comprise a flow diagram of the processing of an initial focus scan, which uses a method referred to as a gradient focus score, and determines a starting point for the application of the pattern recognition focusing method.

FIGS. 12A, 12B, 12C and 12D illustrate four simple binary morphological operations.

DETAILED DESCRIPTION OF THE PREFERRED EMBODIMENT

Figure 1A:
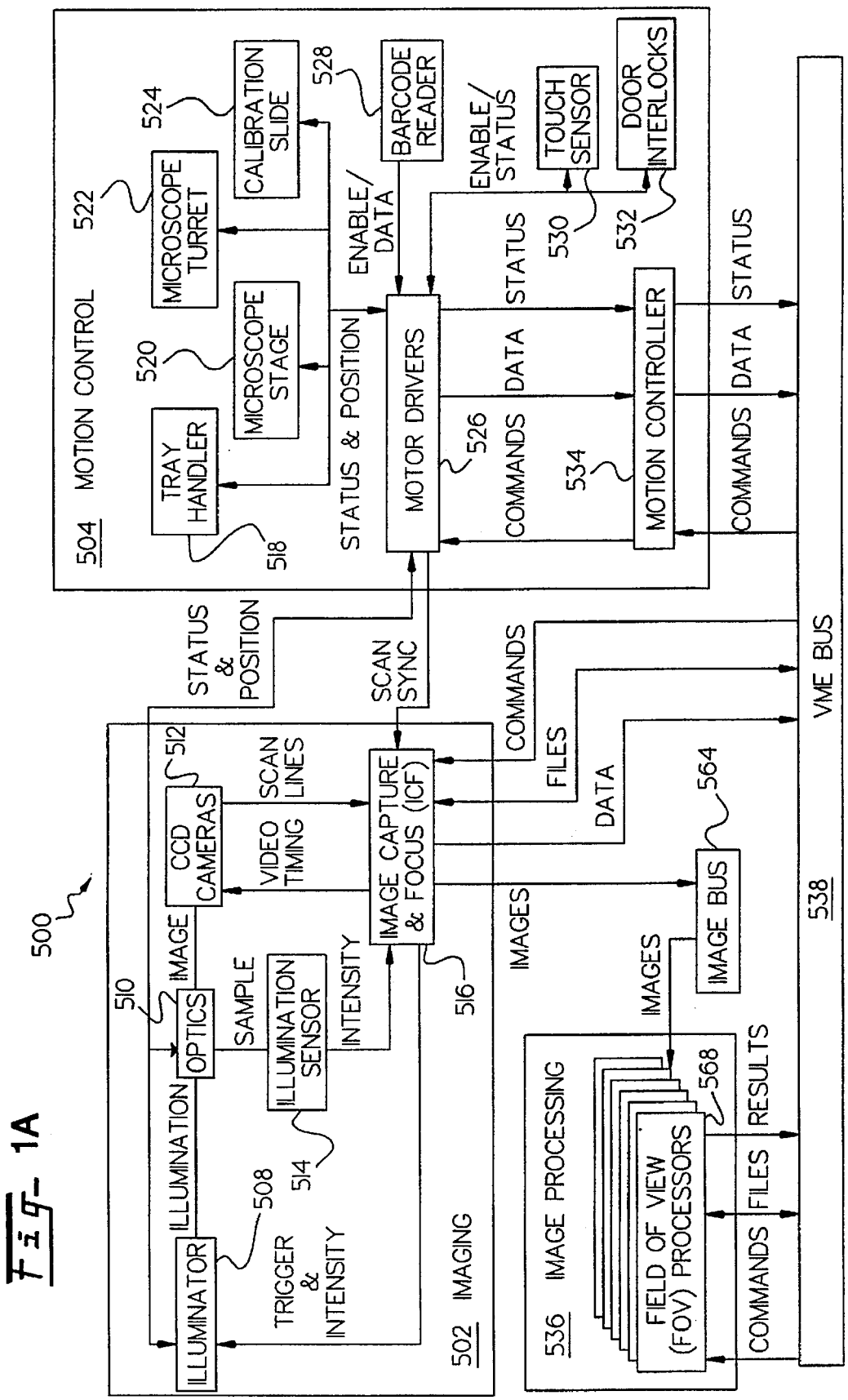

In a presently preferred embodiment of the invention, the system disclosed herein is used in a system for analyzing cervical pap smears, such as that shown and disclosed in pending U.S. patent application Ser. No. 08/571,686, filed Dec. 13, 1995, which is a file wrapper continuation of abandoned U.S. patent application Ser. No. 07/838,064, entitled "Method For Identifying Normal Biomedical Specimens", by Alan C. Nelson, et at., filed Feb. 18, 1992; U.S. Pat. No. 5,528,703 which is a continuation in part of abandoned U.S. patent application Ser. No. 07/838,395, entitled "Method For Identifying Objects Using Data Processing Techniques", by S. James Lee, filed Feb. 18, 1992; U.S. patent application Ser. No. 07/838,070, now U.S. Pat. No. 5,315,700, entitled "Method And Apparatus For Rapidly Processing Data Sequences", by Richard S. Johnston et at., filed Feb. 18, 1992; U.S. patent application Ser. No. 07/838,065, now U.S. Pat. No. 5,361,140 entitled "Method and Apparatus for Dynamic Correction of Microscopic Image Signals" by Jon W. Hayenga et al., filed Feb. 18, 1992; and allowed U.S. patent application Ser. No. 08/302,355, filed Sep. 7, 1994, for which the issue fee has been paid, entitled "Method and Apparatus for Rapid Capture of Focused Microscopic Images" to Hayenga et at., which is a continuation-in-part of abandoned U.S. patent application Ser. No. 07/838,063 filed on Feb. 18, 1992 the disclosures of which are incorporated herein, in their entirety, by the foregoing references thereto.

The present invention is also related to biological and cytological systems as described in the following patent applications which are assigned to the same assignee as the present invention, filed on Sep. 20, 1994 (unless otherwise noted), and which are all hereby incorporated by reference including pending U.S. patent application Ser. No. 08/309,118 to Kuan et al. entitled, "Field Prioritization Apparatus and Method," pending U.S. patent application Ser. No. 08/309,061 to Wilhelm et al., entitled "Apparatus for Automated Identification of Cell Groupings on a Biological Specimen," pending U.S. patent application Ser. No. 08/309,116 to Meyer et al. entitled "Apparatus for Automated Identification of Thick Cell Groupings on a Biological Specimen," U.S. patent application Ser. No. 08/667,292, filed Jun. 20, 1996, which is a file wrapper continuation of abandoned U.S. patent application Ser. No. 08/309,115 to Lee et al. entitled "Biological Analysis System Self Calibration Apparatus," pending U.S. patent application Ser. No. 08/678,124, filed Jul. 11, 1996, which is a file wrapper continuation of abandoned U.S. patent application Ser. No. 08/308,992 to Lee et at. entitled "Apparatus for Identification and Integration of Multiple Cell Patterns," allowed U.S. patent application Ser. No. 08/309,063 to Lee et at. entitled "A Method for Cytological System Dynamic Normalization," allowed U.S. patent application Ser. No. 08/309,248 to Rosen of et al. entitled "Method and Apparatus for Detecting a Microscope Slide Coverslip," U.S. patent application Ser. No. 08/309,077 now U.S. Pat. No. 5,566,249, issued Oct. 15, 1996 to Rosenlof et al. entitled "Apparatus for Detecting Bubbles in Coverslip Adhesive," pending U.S. patent application Ser. No. 08/309,931 to Lee et al. entitled "Cytological Slide Scoring Apparatus," pending U.S. patent application Ser. No. 08/309,148 to Lee et at. entitled "Method and Apparatus for Image Plane Modulation Pattern Recognition", pending U.S. patent application Ser. No. 08/309,250 to Lee et at. entitled "Apparatus for the Identification of Free-Lying Cells," pending U.S. patent application Ser. No. 08/309,117 to Wilhelm et al., entitled "Method and Apparatus for Detection of Unsuitable Conditions for Automated Cytology Scoring." Also incorporated by reference is allowed U.S. patent application Ser. No. 08/455,296, filed May 31, 1995, for which the issue fee has been paid, assigned to the same assignee, to Lee et at., entitled "Method and Apparatus for Continuously Monitoring and Forecasting Slide and Specimen Preparation for a Biological Specimen Population".

Figure 1C:
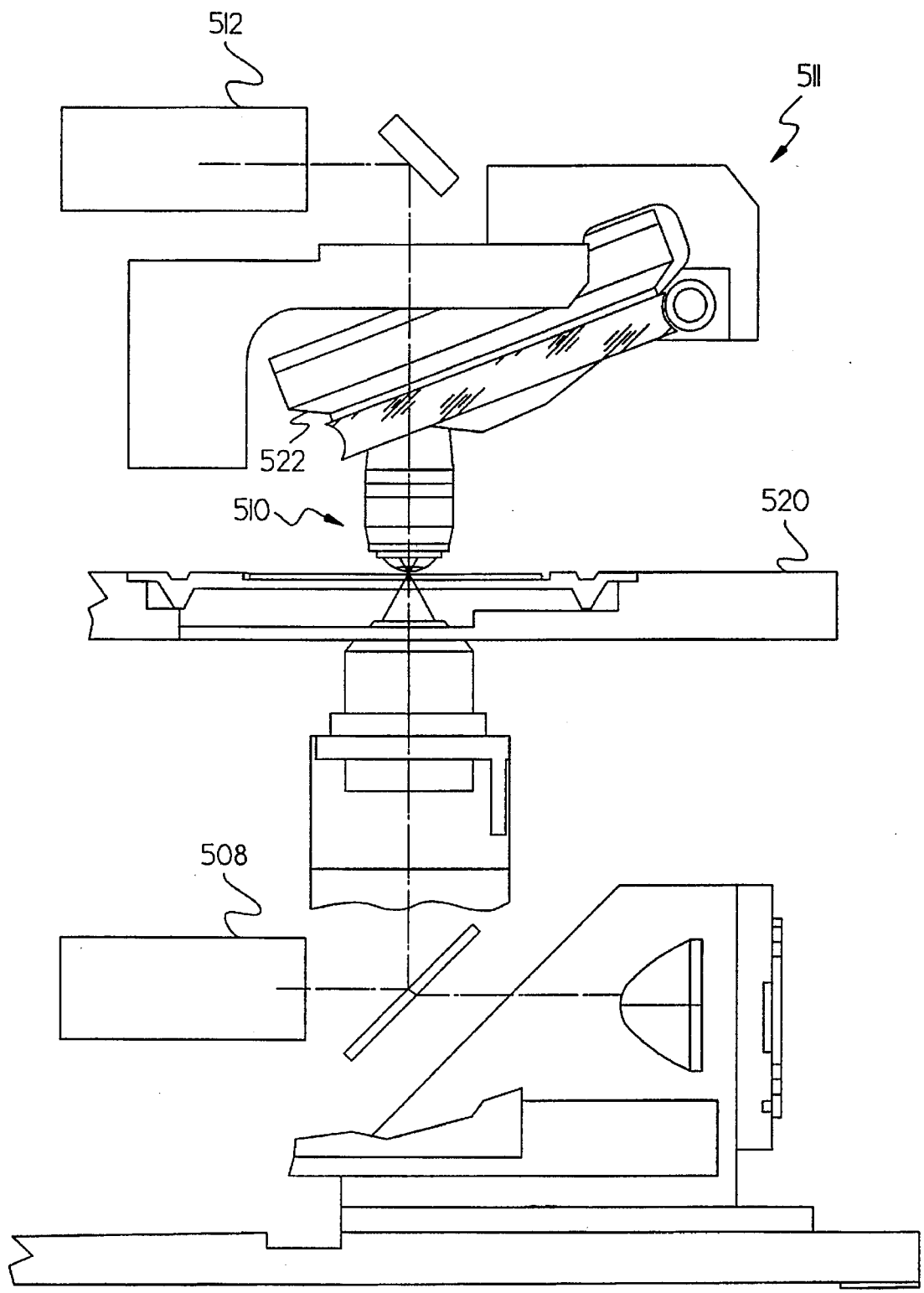

Now refer to FIGS. 1A, 1B and 1C which show a schematic diagram of one embodiment of the apparatus of the invention for assessing slide and specimen preparation quality 500. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In some embodiments optics 510 may comprise color filters. In one embodiment of the invention, the optics may further comprise an automated microscope 511. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a MOTOROLA 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a workstation. A tape drive 546 is connected to the workstation 550 as well as a modem 548, a monitor 552, a keyboard 554, and a mouse pointing device 556. A printer 558 is connected to the Ethernet 560.

During operation, the central computer 540, running a real time operating system, controls the microscope 511 and the processor to acquire and digitize images from the microscope 511. The computer 540 also controls the microscope 511 stage to position the specimen under the microscope objective, and from one to fifteen field of view (FOV) processors 568 which receive images under control of the computer 540.

It is to be understood that the various processes described herein may be implemented in software suitable for running on a digital processor. The software may be embedded, for example, in the central processor 540.

Refer now to FIG. 2 which shows a process flow diagram of the method for assessing slide and specimen preparation quality of the invention. A technician gathers a set of laboratory slides with representative normal and abnormal slides in step 10. In the preferred embodiment, the assessor acquires 400 slides. The slide set comprises the following slides:

200 within normal limit slides, 150 low grade SIL slides, and 50 high grade SIL slides.

Low grade squamous intraephithelial lesions (SIL) and high grade SIL are low grade and high grade squamous intraephithelial lesions of the uterine cervix.

The slides in each category may advantageously be less than one year old and should be randomly selected from a laboratory's single slide case archive. In one preferred embodiment, all of the slides may preferably have glass coverslips.

An automated system, such as, for example, is described in the referenced patents, processes the slide set to obtain data for assessing slide and specimen preparation quality in step 20. In one preferred embodiment, the automated system may comprise the AutoPap®300, available from NeoPath, Inc, located in Bellevue, Wash. The automated system processes and obtains data from the acquired slides.

In steps 30–70, the automated system performs a series of tests on the data obtained in step 20. In step 30, the automated system performs a Slide Physical Characteristics Test to evaluate the physical characteristics of Pap Smear slides to determine if they may be successfully scanned by a predetermined automated biological specimen analyzer, such as the AutoPap®300 System. The Slide Physical Characteristics Test evaluates the physical characteristics of the slides acquired from the laboratory. These physical characteristics may include, for example, the characteristics shown in Table 1.

TABLE 1

Figure 4:
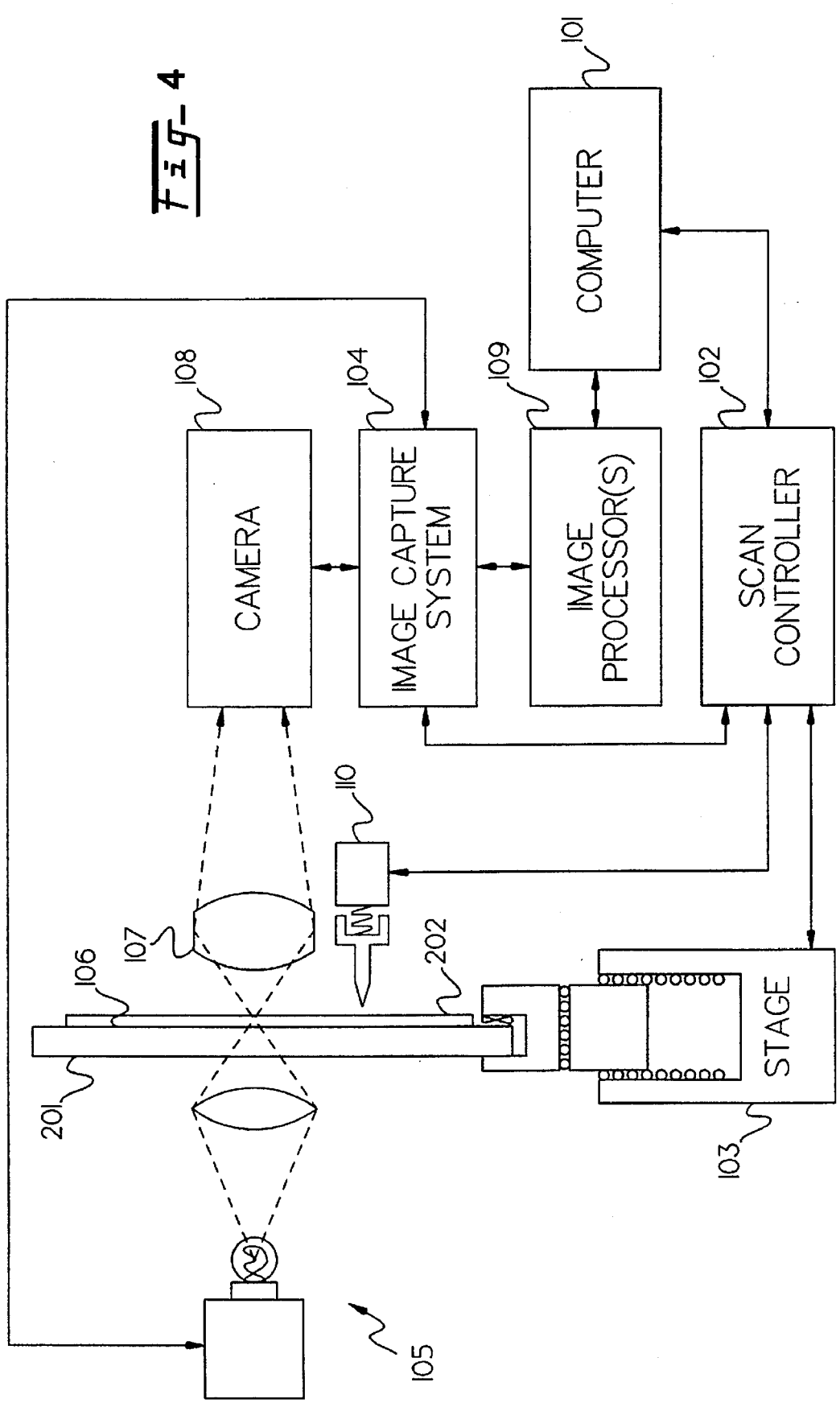
FIG. 4 shows a simplified schematic block diagram of an apparatus of the preferred embodiment.

Slide too thick
Unable to map coverslip surface
Coverslip edges not detected
Coverslip length not 40, 50, or 60 mm
Coverslip width not with limits
Coverslip corners not square
Coverslipped area too small
Coverslip skewed on slide
Unable to focus on specimen
Coverslip and specimen too thin
Coverslip anci specimen too thick The Apparatus and the Specimen Referring to FIG. 4, a simplified schematic block diagram of one example of the apparatus of the invention is shown for greater ease in explaining the method and apparatus of the invention. The apparatus shown comprises a central computer 101, a real time scan controller system 102, which coordinates the motion of the motorized stage 103 of the microscope with the image capture system 104, a stroboscopic illumination system 105, a low-power microscope objective 107, an electronic camera 108 of the CCD type, one or more dedicated image processing systems 109, and a touch sensor 110. The stroboscopic illumination system 105 focuses a brief flash of light on the specimen 106. The specimen 106 is mounted on a glass slide 201 and protected under a transparent coverslip 202.

The computer 101 may be advantageously programmed to guide the steps of the focusing procedure as described in detail below. In FIG. 4, the arrows between the various components generally represent the flow of information between the parts of the apparatus.

Figure 5:
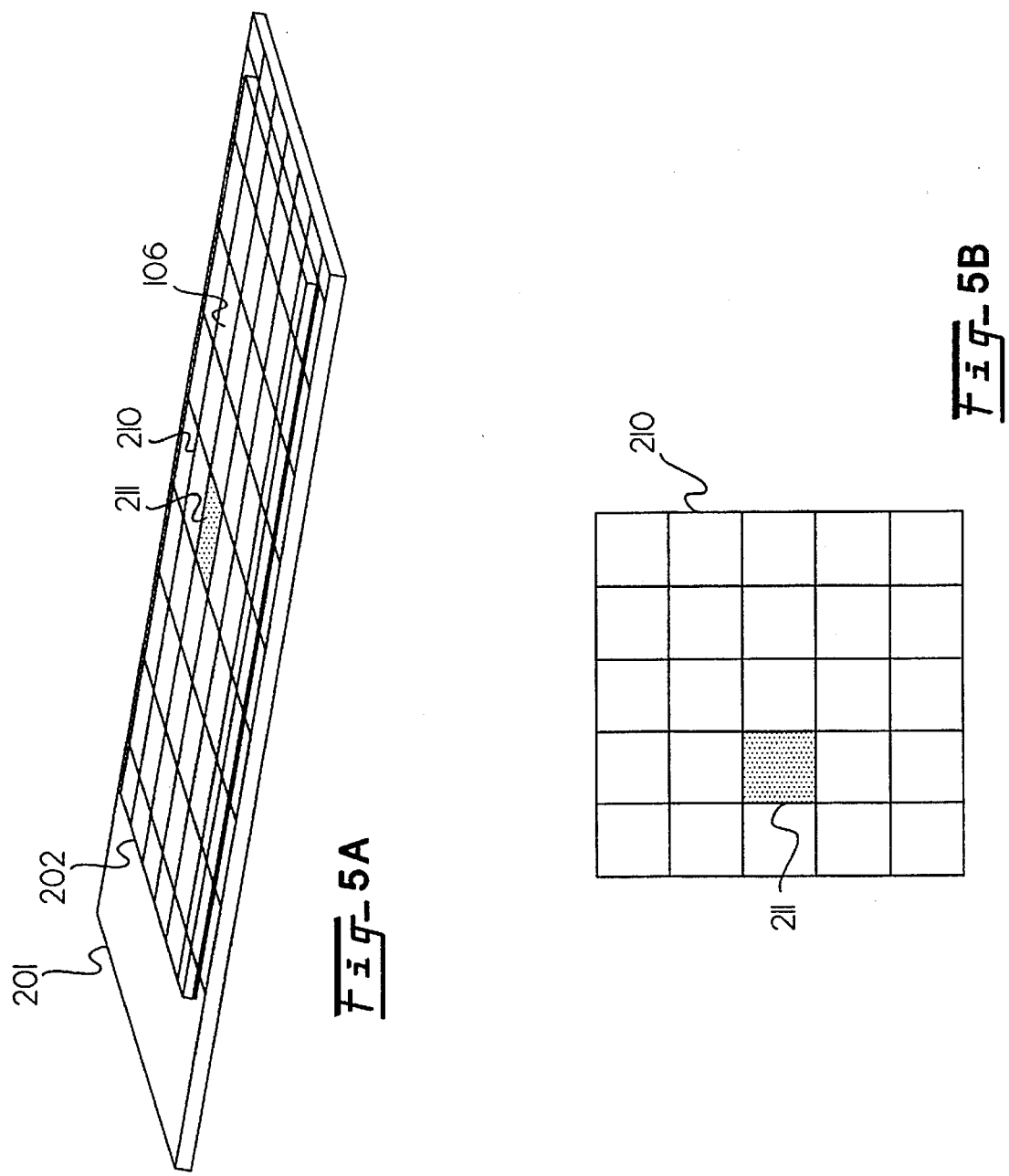
FIG. 5A shows a schematic of a coverslip and slide containing a specimen to be analyzed.
FIG. 5B is a diagram of a single low magnification field of view.

FIG. 5A schematically shows a more detailed view of a slide 201 on which a typical specimen 106 is mounted, then covered with a transparent coverslip 202. A typical slide 201 may be eighty millimeters long by twenty seven millimeters wide by one millimeter thick. A typical coverslip 202 may be sixty millimeters long by twenty four millimeters wide by 0.13 millimeters thick. The best focus on the specimen 106 varies from point to point, due both to warpage in the slide-coverslip combination, and to the intrinsically three-dimensional nature of the specimen itself.

A grid 203 is shown superimposed over the slide 201 in FIG. 5B. The grid 203 may not be visible in the physical embodiment of the invention, but is used herein for illustrative purposes. Grid 203 is not shown to scale. The grid 203 illustrates the division of the slide into low magnification fields of view such as 210, shown in more detail in FIG. 5B. Each of the low magnification fields of view 210 is divided into twenty five high magnification fields of view 211, for example. In one embodiment of the invention, a captured, digitized image of a low magnification field of view contains 512×512 pixels, and represents a specimen area of about 1.4 mm×1.4 mm.

Finding the Coverslip

Figure 6:
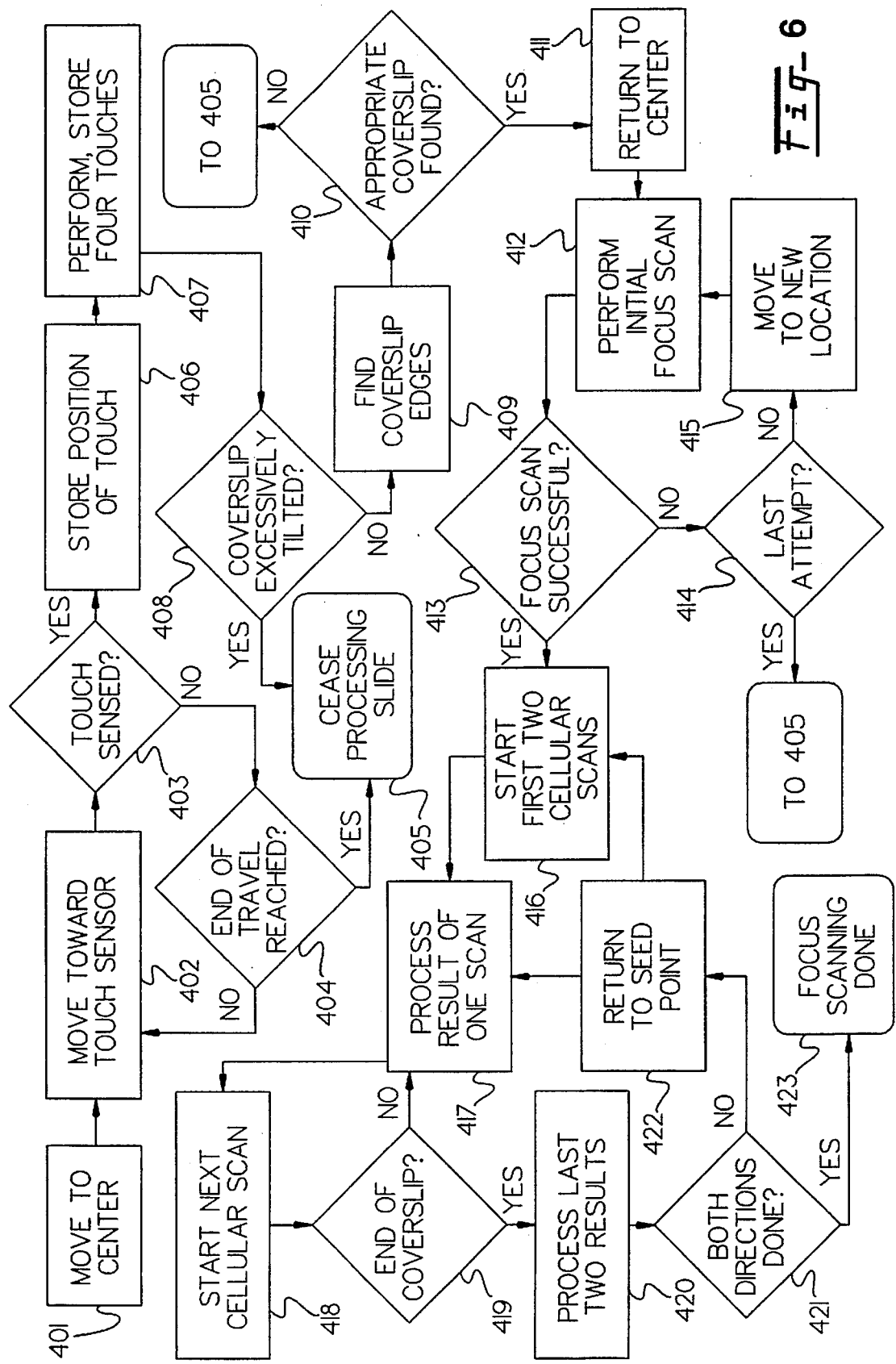
FIG. 6 is a high level flow diagram of a process by which the best focus positions on a specimen are determined.

Referring to FIG. 4 while now also referring to FIG. 6, focusing on a specimen begins with the central computer 101 issuing instructions to the scan controller 102 to move the stage 103 to a predefined central location at process step 401. The central location is chosen with respect to the approximately known physical location of the specimen 106 in such a way that even a small coverslip, if properly placed over the specimen, must cover a substantial region around the central location.

At step 402, the central computer 101 instructs the scan controller 102 to move the stage 103 in the axis perpendicular to the slide 201, so that the specimen 106 approaches the touch sensor 110. This motion continues until either the touch sensor 110 records contact with the coverslip 202 over the specimen 106 at step 403, or the end of travel is reached, step 404. Reaching the end of travel at step 404 indicates that either no slide, or a slide which is too thin for the apparatus, is present, in which case the automatic processing of the slide in question halts at step 405.

When the touch sensor 110 indicates contact with the coverslip over the specimen 106 at step 403, the scan controller 102 reports the stage location at which the touch occurred to the central computer 101, which stores it at step 406. This location indicates the stage location of the top of the coverslip at the central point, and is used as a starting point for focusing. If the touch sensor indicates contact with the coverslip at a point higher than a predetermined height, the slide is too thick. In which case the automatic processing of the slide in question halts. In particular, the location of the touch sensor 110 is calibrated to be a known distance from the focal plane of the objective lens 107 by using targets designed for this purpose. At step 411, this calibration is used to move the stage 103 to a position such that the focal plane of the objective 107 lies just below the top of the coverslip 202 at the central touch location.

Before focusing can continue, however, the location of the coverslip must be better determined. Toward this end, at step 407, four more touches, substantially similar to the first one described above at steps 402 through 404, are performed at separate locations on the slide within a minimum central coverslip area. The location of the coverslip at each of these touches is also recorded. At step 408, a least squares plane is constructed from the five touch locations, and the tilt of the plane is compared with an allowed maximum. If the tilt exceeds the maximum, or if any of the four touches failed to record a location, processing of the slide is halted at step 405. An excessively tilted coverslip at step 408 usually indicates that the slide is improperly loaded in the apparatus.

At this point, since the approximate position of the coverslip is known, a more detailed search for its edges is undertaken at step 409. At step 410, if the coverslip edges were not found, or if they indicated an inappropriate size or shape, processing of the slide is once again halted at step 405.

At step 411, the stage is returned to the center touch location, at such a height that the objective 107 focal plane is just beneath the touched surface of the coverslip 202. At step 412, focusing of the specimen 106 proceeds, with the central computer 101 instructing the scan controller 102 to coordinate the stage 103 motion with the image capture system 104 in order to perform an initial focus scan, starting from the position where the objective 107 focuses an image from just beneath the surface of the coverslip 202 at the central touch location onto the CCD camera 108.

The Initial Focus Scan

At this point we describe the initial focus scan in detail, referring in turn to FIGS. 5A, 5B, 6, 7, 8, 9. 10 and 11, while also referring to FIG. 4.

Figure 7:
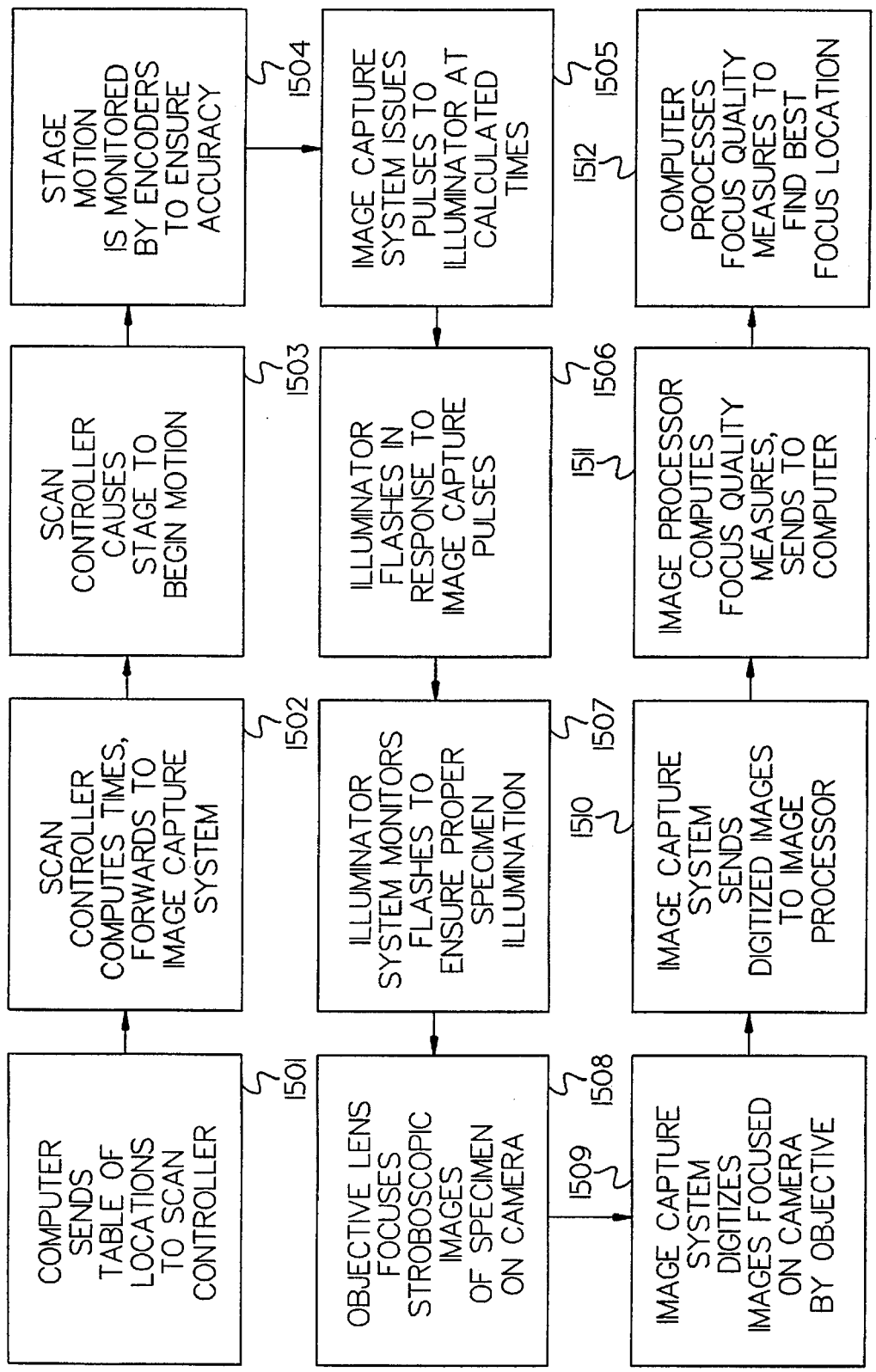
FIG. 7 is a flow diagram of a process by which images from different focal depths are gathered and processed in an example of the preferred embodiment.

The purpose of a focus scan is to acquire and process images from different focal planes in a specimen, in order to find the best focal plane. Any focus scan, in this example of the preferred embodiment, is performed as follows. Referring jointly to FIGS. 4 and 7, the central computer 101 passes to the scan controller 102 a list of stage locations at which images are to be collected, at step 1501. The stage locations are chosen to cause the objective 107 to focus at different planes in the specimen 106.

The scan controller 102 computes the timing of the motion of the stage, and constructs a table, giving successive positions of the stage when images are to be collected, and the time when the stage will be at each location. The table entries are computed and passed to the image capture system 104 at step 1502.

Once the image capture system 104 has received the table, at step 1503, the scan controller 102 initiates the motion of the stage 103. The motion of the stage is monitored by encoders at step 1504 to ensure accuracy. Any incorrect stage locations will be reported to the computer 101, which may reset the stage and restart processing.

At each time listed in the table, the image capture system 104 signals the stroboscopic illuminator 105 to flash at step 1505. The illuminator 105 focuses a brief flash of light on the specimen 106 at the specified location at step 1506. The illuminator system monitors the flashes of the strobe with a light sensor at step 1507. Any missing flashes, or flashes of incorrect intensity, will be reported to the computer 101, which may halt processing of the slide.

At step 1508, the objective 107 focuses an image from the illuminated field of view of the specimen 106 onto the camera 108. At step 1509, the image capture system 104 collects a digital representation of the image thus acquired from the camera 108. In one example, the digital representation of the image consists of 512 rows by 512 columns of pixels, each of which is assigned a gray level from zero, representing the darkest level, to 255, representing the brightest. If necessary, the image may be sent in analog form from the camera 108 to the image capture system 104, then passed through an analog to digital converter to create the digital representation.

The image capture system 104 sends each digital image it acquires to the image processor(s) 109 at step 1510. The dedicated image processor(s) 109 perform a pre-programmed sequence of morphological, computational, and logical operations on each image sent from the image capture system 104 to derive one or more measures of focus quality. These measures are computed and sent to the computer 101 at step 1511. Once the computer 101 receives the measures from every image in the list originally sent to the scan controller 102 at step 1501, it processes the list of measures in order to determine the optimum focus location at step 1512.

All the while images are being captured and processed, the stage 103 continues to move the specimen 106 in accordance with the instructions from the scan controller 102, from step 1503 onward, until the list of images to be collected is exhausted.

The initial focus scan starts, as noted above, from a position where the objective 107 is focused on an image plane just beneath the surface of the coverslip at the central touch location. It proceeds further beneath the coverslip, collecting one image for each depth of focus of the objective 107, until it is past the depth corresponding to the maximum coverslip optical thickness. The maximum coverslip optical thickness may be a predetermined allowable thickness depending upon the particular apparatus employed.

The initial focus scan is used to identify a starting point, called the seed point, for focusing the system on the specimen. Since it is not important whether or not this starting point is derived from cells in the specimen, or just dust or other matter on the surface of the slide, morphological pattern recognition is not used for the initial focus scan.

Instead, a simpler intensity gradient focus quality measure is computed as follows. Refer to FIG. 8, which shows the process flow diagram for the image processor when computing the gradient focus score. To begin with, at step 601, a histogram is computed of the gray levels of the image. This histogram is used to calculate a measure of the illumination brightness, or light level, present in the image. In particular, the light level may be defined as the highest intensity level at which 0.1% or more of the pixels of the image record a still higher intensity.

At step 602, the horizontal and vertical gradients in light intensity are computed at each of the pixels in the digitized image. For the vertical gradient, the computation is performed at each pixel by subtracting the intensity value of the pixel immediately below from that of the pixel immediately above. The horizontal gradient is computed in an analogous way. These gradients are compared to a threshold in order to reduce the effect of image noise on the measure of image sharpness. Gradients below the predetermined threshold value are treated as zero. Those skilled in the art, having the benefit of this disclosure, will understand that the threshold value may be derived empirically, or from the noise characteristics of the specific imaging apparatus used.

In order to be able to distinguish the best focus locations of different regions within the field of view, the image processor divides the field of view into a five by five grid, like the one shown in FIG. 5B, at step 603. Subsequent processing computes twenty five separate focus measures, one for each of the twenty five regions in the grid.

At step 604, fifty histograms are computed, two for each of the twenty five grid regions in the image. The two histograms are computed on the horizontal and vertical gradient images, respectively.

Even a focusing procedure which does not perform pattern recognition must take some account of the size of the objects to be focused, in order to acquire information from the appropriate range of spatial frequency. Because the focusing system described here is designed to work at low magnification on small objects, the intensity gradient algorithm takes size into account by using only the fifty highest gradients in each of the twenty five regions at step 605. The rest of the gradient histogram is ignored.

At step 606, the squares of these fifty gradients are summed, and divided by the light level, in order to produce twenty five focus scores for each image in the focus scan. The light level is used to normalize the scores in order to reduce their dependence on illumination from quadratic to linear. This is useful because the algorithm may be used on images in a context where the illumination may be, for some reason, obscured.

Once the image processing system 109 has computed the twenty five gradient focus scores for each image in the initial focus scan, it passes these scores, along with the matching focus positions, back to the central computer 101, as described above and shown as step 1511 in FIG. 7.

The task of the central computer 101 in step 1512 of FIG. 7 is to look for peaks in the focus score as a function of focus position in each of the twenty five regions, ignore spurious fluctuations due to noise, and make an initial approximation of the best focal plane. It accomplishes this as shown in FIG. 9.

First, at step 620, the scores for each region are filtered across focus position in order to reduce noise in the focus scores. For this purpose, a Gaussian kernel with a half width at half maximum equal to the depth of field of the objective is used.

Second, at step 621, the derivative of the focus score with respect to position is computed for each region and position by subtracting the filtered focus score at each position and region from the succeeding position's filtered focus score for the same region.

Third, at step 622, peaks in the focus score in all regions are identified by looking for patterns across position of two positive derivatives followed by two negative derivatives, and checking to make sure that the focus score at the peak is above a pre-defined minimum, to avoid finding spurious peaks. The precise location of the peak is found by linear interpolation of the gradient to the zero crossing.

FIG. 7 illustrates the process of finding the peaks by plotting an example of the original focus scores 701, the Gaussian-filtered focus scores 702, and the differences of the filtered scores 703, versus focus position. The scores plotted in FIG. 7 represent the values found from a single region. The interpolated zero of the derivative at 704 represents the calculated position of the peak. Note the positive derivatives before the peak, and the negative derivatives after the peak.

Fourth, in step 623, the sharpness of each peak is measured by dividing the magnitude of the second derivative of the filtered focus scores at the peak by the magnitude of the peak. The sharpness provides an indication of how definite a preference for the given focus position the peak indicates.

Fifth, in step 624, all of the peaks found in all regions are divided into two classes: those which are one minimum coverslip optical thickness or more below the highest peak found, and those which are not. They are divided in order to separate any peaks which may be coming from dust on top of the coverslip from peaks coming from the specimen proper.

Sixth, at step 625, in each region, the peak with the highest focus score in each class is kept, while any other peaks in the same region and class are ignored. As a result, there are at most twenty five peaks in each class to consider.

Seventh, at step 626, a weighted average of the position of the peaks in each class is taken to represent the best focus position for the full field of view in each class. The peak positions are weighted by the relative peak sharpness calculated in step 623 to derive the weighted average. If any peak has a sharpness which is more than a factor of four less than the sharpest peak in the class, it is dropped from the averaging as being too soft a peak at this step. This leaves at most two possible focus positions. Note that it is possible that all the peaks are in the upper class, in which case there is only one focus position at this stage.

Eighth, to avoid the possibility of focusing on the top of the coverslip, if there are two focus positions, the class which is lower (further beneath the coverslip) is chosen as representing best focus on the specimen at step 627.

Ninth and finally, at step 628, if there were no valid peaks found at step 622, the scan fails to find a best focus position at step 630. Otherwise, the focus position chosen at step 627 is stored by the computer 101 at step 629. This completes the discussion of the initial focus scan.

Multiple Tries of Initial Scan

Referring back to FIG. 6, the result of the initial focus scan at step 412 is thus either a starting focus position, or a failure to find a peak. In nearly all cases, when a specimen-bearing slide which meets the physical requirements for coverslip thickness and placement is used, the initial focus scan described above is successful. This is because it requires very little material to focus on, and the scan is undertaken in the center of the slide, where there is likely to be some specimen.

However, if a failure is found at step 413, additional attempts are made to find a seed point for focusing. In particular, if fewer than a set number of attempts have been made at step 414, a new location is selected at step 415 on a field of view adjacent to the one at which a focus scan was just attempted, and processing returns to attempt another initial scan at step 412. The succeeding attempts may occur in a spiral pattern around the original touch point, so as to continue selecting new fields of view while remaining as close as possible to the central touch location. Only if all of the set number of attempts have been unsuccessful at step 414 does processing of the slide cease at step 405.

Once an initial focus position is found at step 412, the pattern recognition, or cellular, focus scans begin from this point, referred to as the seed point to create a map of the focus surface.

Figure 11:
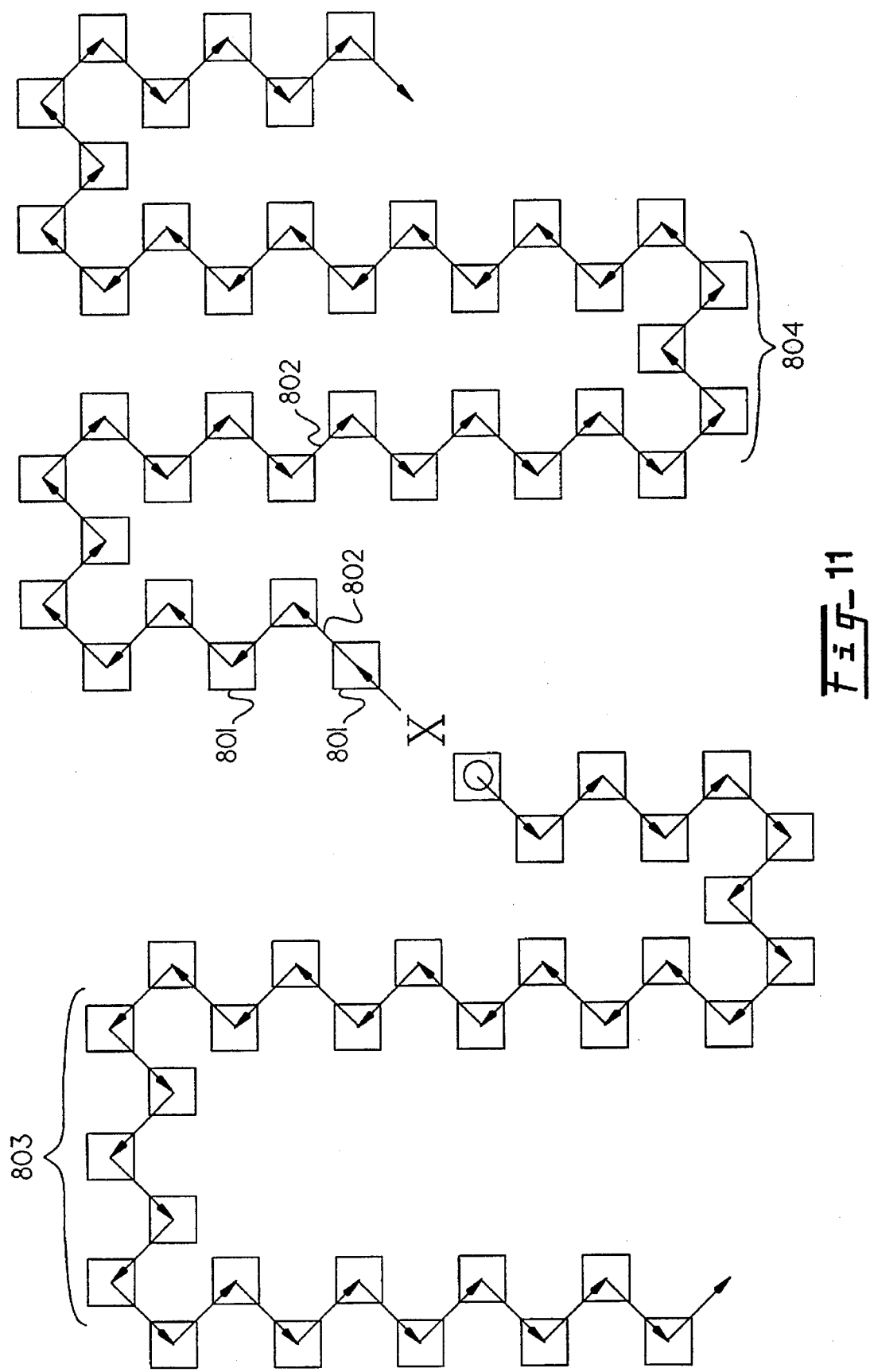
FIG. 11 shows paths of pattern recognition focus scans, referred to as cellular focus scans, over the surface of a specimen.

FIG. 11 illustrates the path of the cellular focus scans across the surface of the specimen, where the location of the seed point is marked with an "X". The squares 801 indicate the fields of view scanned, while the arrows 802 show the path the stage follows. The purpose of following the path indicated is to come as close as possible to achieving a representative sample from the slide, while minimizing the time taken to scan. The stage used takes no more time to move simultaneously in two dimensions than to move in just one, so the diagonal moves illustrated maximize the speed of motion.

Referring also back to FIG. 6, at step 416, the first scans occur to the right of, and adjacent to, the seed point in FIG. 11. The zig-zag pattern illustrated in FIG. 11 turns around, as for example at 804, each time scanning approaches one of the edges of the coverslip. The entire pattern must come to an end before the far right end of the coverslip in FIG. 11.

Scanning then resumes at steps 422 and 416, again starting adjacent to the seed point, to the left of the seed point, at the scan marked with a circle in FIG. 11. Note that the last reversal of scanning 803 drawn in FIG. 11 takes five steps, rather than the three steps taken by 804 and every other reversal. This illustrates the fact that, under conditions to be described below, the number of steps in a reversal is increased from three to five in order to speed processing of the specimen.

The first two cellular focus scans are centered about the focal plane defined by the seed point. Cellular focus scans are much more shallow than the gradient scans described above, consisting of the acquisition and processing of only four images, again separated by roughly the depth of focus of the objective lens. This makes the cellular scans much faster. Finding the best focus position from a cellular scan is necessarily a simpler operation than from a gradient scan, because there are only four points to work with. More burden is placed on the processing of the image to weed out signal from noise, and in particular, to recognize and focus principally on the nuclei of well-separated cells. Note that cells in clumps often provide less useful information, if their nuclei cannot be clearly distinguished.

Cellular Morphology

The processing of an image in a cellular focus scan is comprised of a combination of simple morphological operations. FIGS. 12A–12D illustrate four simple binary morphological operations. FIG. 12A illustrates an erosion with a three by three block, while FIG. 12B demonstrates a dilation with the same block. FIG. 12C shows an erosion with a five by five wire frame, and FIG. 12D illustrates a dilation with the same wire frame.

A morphological operation, such as an erosion or dilation, involves two entities. The first entity is the image which is operated on, and the second entity is a structuring element with which the operation is performed. The structuring element may be pictured as a grid of pixels, whose values are either "on" or "off", and which possesses a unique center pixel. The center pixels of the structuring elements in FIGS. 12A–12D are marked with X's.

A morphological operation may be envisions as placing the center of the structuring element, in turn, over each pixel in the original image. A binary operation operates on images whose pixels are either "on" or "off". The two simplest operations are binary erosion and dilation. Binary erosion turns "off" all pixels in the image which, when the structuring element is centered on them, have at least one "off" pixel of the image aligned with an "on" pixel of the element. All other pixels in the image are set to "on". Dilation turns "on" in the image all pixels which, when the structuring element is centered on them, have at least one "on" pixel of the image aligned with an "on" structuring element pixel. All other pixels are set to "off".

Binary erosion and dilation are readily generalized to grayscale erosion and dilation. Grayscale erosion replaces each pixel's value in the image by the minimum of the values of those pixels which correspond to "on" pixels in the element. Grayscale dilation replaces each pixel's value with the maximum of the values of those pixels which correspond to "on" pixels in the element. Erosion and dilation are combined to make compound operations. In particular, a dilation followed by an erosion with the same element is referred to as a closing, while an erosion followed by a dilation is an opening.

Figure 10:
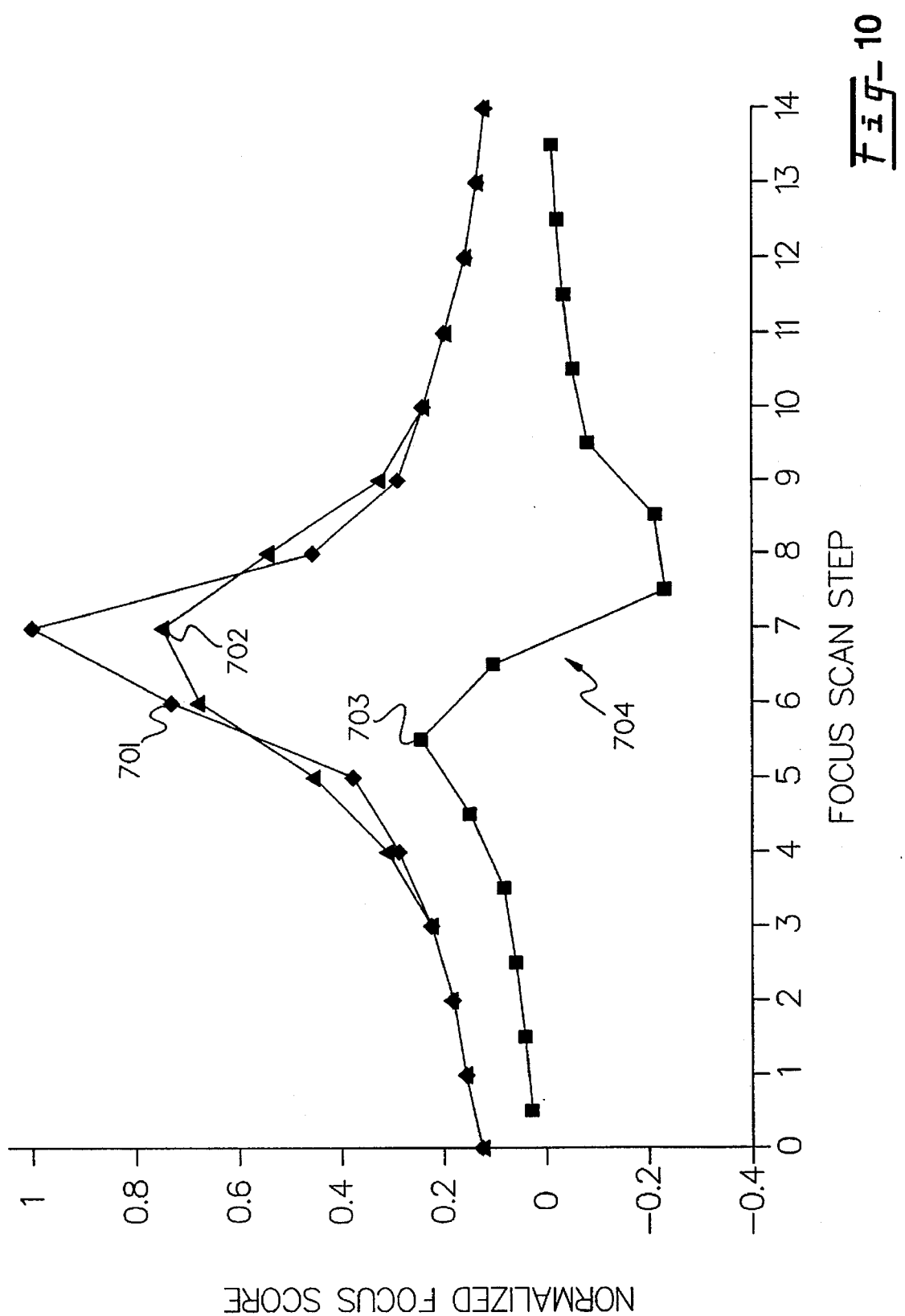
FIG. 10 is an example plot of a gradient focus score across a set of focal depths, a filtered version of the same, and the computed derivative of the filtered version, where the plots are used to illustrate a method by which peaks are found in the gradient focus score.
Figure 13:
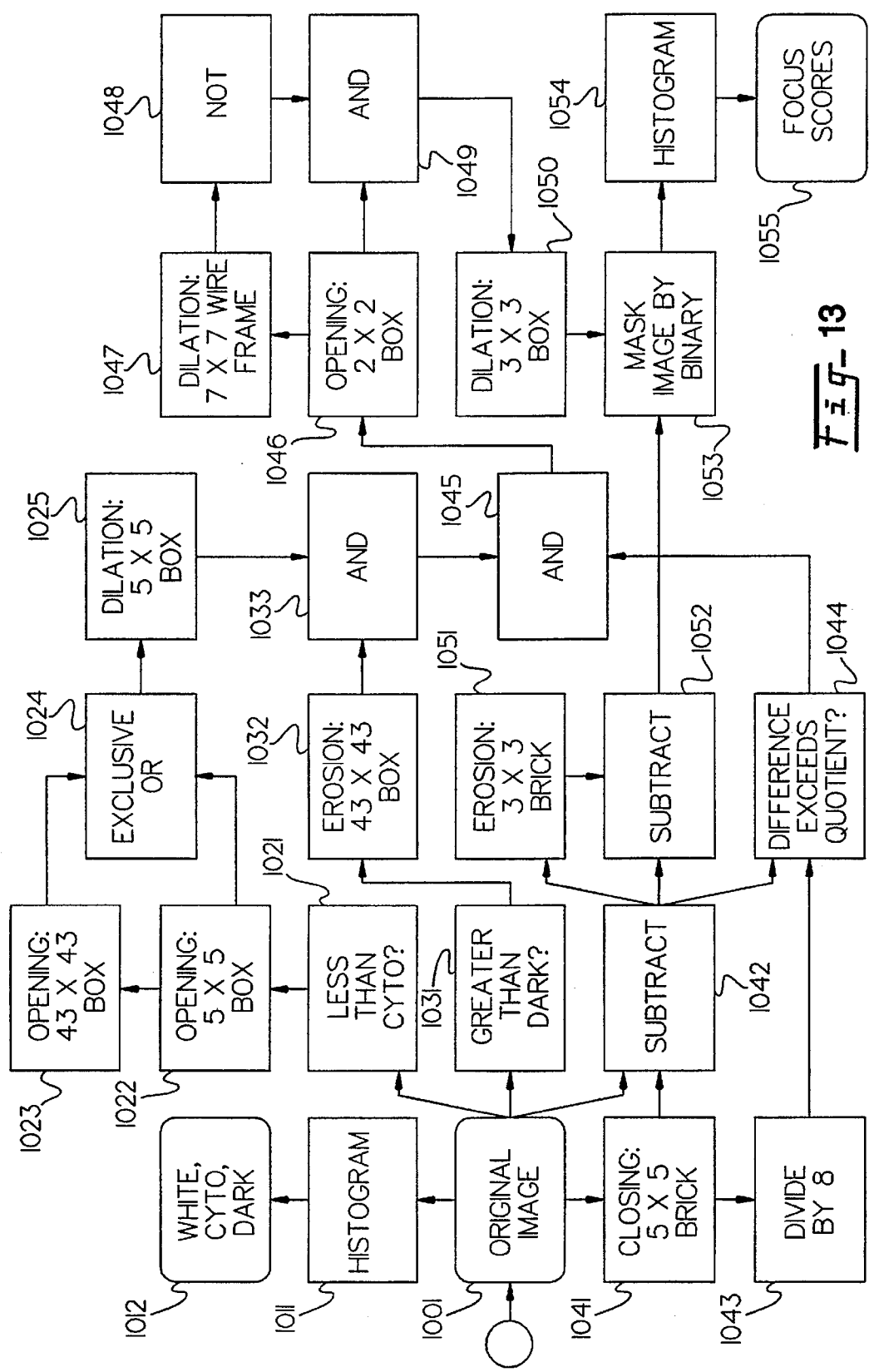
FIG. 13 is a data flow diagram of the cellular focus score morphological process.

FIG. 13 is a data flow diagram of the cellular focus score morphological process. Each image from each cellular focus scan, after being stored in the camera 108 and digitized by the image capture system 104, is processed through this set of operations by the image processor(s) 109. As shown in FIG. 10, the process has four main branches.

On the first branch, a histogram 1011 is taken of the grayscale values of the image 1001, and three grayscale values 1012, called the white, cyto, and dark levels, are computed from the histogram. The white value is the same as the light level described in the discussion of the gradient focus score above. The cyto level is defined as 95% of the white value. As the name implies, regions of the image with gray levels below this level probably represent areas with at least some cytoplasm. The dark level is defined as $1/15$ of the white value, plus a quantity representing a noise floor. Regions of the image with gray levels below the dark value represent either thick clumps of specimen, or artifacts of other material. Such regions are excluded from consideration in focusing.

On the second branch of the cellular morphology process, each pixel in the original image 1001 is tested at step 1021 to see if its gray level exceeds the cyto threshold. If it does, the corresponding pixel in a binary image is set to zero; if not, the binary pixel is set to one. The binary image thus produced passes through a morphological opening 1022 by a five by five box, followed by an opening 1023 by a 43 by 43 box.

The opening 1022 by the five by five box is designed to reject regions which are too small to actually represent cells, while the opening 1023 by the 43 by 43 box detects regions which are so large that they must represent groups of cells stuck together, rather than cells with gaps between them. In accord with the requirements of focusing on free-lying cells, the results of the two openings are exclusive-or'd together at step 1024 to generate a cytoplasmic binary image, which is then dilated 1025 by a five-by-five box, to pick up any nuclei which may be on the edges of their cells.

The third branch of the cellular focus score algorithm checks each pixel of the original image 1001 at step 1031 to find out if it has a gray level greater than the dark level defined above. If it does, the corresponding pixel of a binary image is set to one; if not, to zero. The resulting dark binary image is eroded 1032 by a 43 by 43 box to prevent focusing on the edges of thick clumps of specimen, or on regions laced with artifacts. The dark binary image is then and'd 1033 with the cytoplasmic binary image, to produce a binary image representing the allowed regions for nuclei to be recognized.

The fourth and final branch of the algorithm is designed to detect nuclei. It begins with a grayscale closing 1041 of the original image 1001 by a five by five brick. This closing will usually efface the nuclei of interest from the image. The original image 1001 is then subtracted at step 1042 from the result of the closing to produce a texture-enhanced inverted image, in which the nuclei appear as prominent bright spots.

In order to develop a binary image which identifies the nuclei, the result of the closing is divided by eight at step 1043, then tested against the texture-enhanced image at step 1044. If the gray level of the texture-enhanced image exceeds that of this measure of the local light level, the pixel in question is flagged as potentially part of a nucleus at step 1044. This binary image is and'd 1045 with the allowed regions binary image, to generate a binary mask of possible nuclear pixels.

The binary mask image thus produced at step 1045 has the defect that few restrictions on nuclear size or shape have been placed on it. The next steps are designed to rectify this limitation. First, an opening 1046 by a two by two box is applied to eliminate solitary pixels or single-width strands of pixels. Second, a dilation 1047 of the resulting mask by a seven by seven hollow frame of pixels is inverted 1048, then and'd 1049 with the mask to get rid of those parts of prospective nuclei which will not fit inside the seven by seven frame. This requires that the prospective nuclei be roughly elliptical in shape. Third and finally, the resulting binary image is dilated 1050 with a three-by-three box, in order to include the edges of the nuclei in the mask. The result of step 1050 is the final mask image, which identifies nuclei meeting all the requirements for focusing.

Even after the nuclei have been identified, it remains necessary to measure the sharpness with which they are focused. In order to do this, the texture-enhanced image produced at step 1042 is eroded 1051 by a three-by-three brick, and the resulting image subtracted 1052 from the texture-enhanced image itself, to produce an enhanced gradient image. At step 1053, this enhanced gradient image is then set to zero wherever the final mask image from step 1050 contains a zero, and left unaltered where the final mask image contains a one.

Finally, a histogram 1054 is taken of the gray levels of the resulting image, in order to add up a measure of the quantity of nuclear matter found, and of course, the sharpness of the focus on the nuclei. Two measures are computed from the histogram 1054 at step 1055 as follows. First, any level of the enhanced gradient image below 5% of the white level is ignored as due to non-nuclear material. Then, any pixel above this level is counted toward the sum of the total number of acceptable nuclear pixels, and the nuclear sharpness measure is computed as the mean square enhanced gradient level of those pixels which are above 5% of the white level. The sum of acceptable nuclear pixels is a measure of the amount of useful specimen found, while the nuclear sharpness measure is divided by the white level to reduce the dependence on light level, then used as the cellular focus score.

Cellular Focus Processing

The central computer 101 thus receives four focus scores and four pixel counts from the image processor(s) 109 for each cellular focus scan performed. The computer processes these measures. The processing occurs as described below.

First, the computer determines which focus score is the highest. If the highest focus score is the one furthest from the coverslip, the result of the focus scan is an indication that it is necessary to move further from the coverslip to seek a better focus plane. If not, the nuclear pixel count of the image with the highest focus score is checked to see if it exceeds 0.1% of the image. If not, there is apparently not enough to focus on in this field of view, and the computer determines to continue scanning in the same plane.

If the nuclear pixel count is greater than 0.1% of the image, and the image with the highest focus score is the one closest to the coverslip, the result of the focus scan is an indication that it might be necessary to move closer to the coverslip to seek a better focus plane. Sufficient data is required before moving toward the coverslip in order to prevent moving to attempted focus on material on the coverslip over very sparse slides.

If the image with the highest focus score is neither at the top nor at the bottom of the scan, and the image with the highest focus score has a nuclear pixel count exceeding 0.1% of the image, then the differences in focus scores can be linearly interpolated to locate the peak. The interpolation is made to the zero crossing in the derivative, analogous to the interpolated zero crossing shown as 704 in FIG. 7. This indicates a successful finding of best focus, and its location is recorded. Finally, the indication for further focusing is to center about the best focus plane recorded.

Refer again to FIG. 6 to follow the usage of cellular focus scans in the focus scanning of the specimen. As noted above, the first two cellular focus scans in step 416 are centered about the plane defined by the seed point. At step 417, the result of the first of these scans is processed by the computer 101. After deriving the result, the computer 101 requests the next cellular scan at step 418.

If the result of the focus scan just processed indicated that focus should be lowered 1103, the requested scan 418 is centered one focus step lower than the scan just processed. If the result indicated that not enough data was available 1105, the requested scan 418 is centered about the same plane as the scan just processed. If the result indicated that focus should be brought higher 1107, the plane of the last successful focus scan is tested to see if the current focus position is less than half a minimum coverslip optical thickness above it. If so, the requested scan 418 is centered one focus step higher. If not, then, to prevent attempting focus on the top of the coverslip, the requested scan 418 is centered about the same plane as the scan just processed.

Referring again to FIG. 6, at step 419 the computer tests the position of the focus scan just requested to see if it is at the far right or left end of the coverslip, in accord with the scanning pattern shown in FIG. 11. If it is not, the computer returns to step 417 to compute the result of the scan just completed, then request a new scan again at step 418. Note that the focal height of each cellular scan is based on the result of the scan two before it. This allows the scan controller 102, image capture system 104, image processor (s) 109, and computer 101 to continuously process focus scans in parallel as fast as the stage can move, with no lag time spent waiting for the results of a computation.

When an end of the coverslip is reached at step 419, there are two focus scan results still to be processed at step 420. Then, at step 421, the computer checks to see if focus scanning has already proceeded in both directions from the seed point as shown in FIG. 11. If it has, the cellular focus scanning of the specimen is complete at step 423. If not, the machine returns to the seed point at step 422, then begins scanning in the opposite direction back at step 416. The first two focus scans in both directions are centered about the plane of the seed point.

A minimum number of successful cellular focus scans is needed to accurately focus on a specimen. In one example embodiment, the minimum number is 24 scans. If this number is not reached after all scans as shown in FIG. 11 are completed, the specimen must be rejected for automatic processing. Pap smears rejected for this reason are usually unsatisfactory because of insufficient squamous cellularity. Additionally, it is possible to have successful scans only in one region of the slide. If successful focus scans do not cover all areas of the slide, the slide is rejected as having specimen distributed in too small an area.

Once a model of the focus surface of the specimen is available, it may be used as a guide to scan the entire specimen under the coverslip at low power magnification. It may also be used as a starting point for the high power magnification focusing of the specimen. If the focus surface is too tilted, high power focusing may not be possible for the entire high power filed of view. If the focus surface is too tilted slide processing ceases. If the focus surface is too variable, focus pans may have provided inaccurate focus information. If the focus map is too variable, slide processing ceases as "unable to focus on specimen".

The successful focus scan data may also be used, along with the height of the coverslip given by the touch sensor, to estimate the optical thickness of the coverslip over the specimen. If the coverslip optical thickness is too large or too small then an unacceptably large spherical aberration is produced when the specimen is viewed through a high resolution objective lens. As a result the specimen may be unsuitable for high power microscopic examination. If the specimen to coverslip top measure, optical thickness, is greater than a first predetermined distance or less than a second predetermined distance the processing of the slide ceases.

In the preferred embodiment, the focus surface model is used to guide low power magnification scanning of the specimen. Areas of the specimen are analyzed for potential abnormality. Each slide area field of view is ranked for likelihood of containing abnormality. If too few fields of view are ranked, the slide may not have been scanned properly, so processing ceases for the slide. During low power magnification scan, bubble areas are identified. If too much bubble area exists, slide processing ceases.

In one embodiment, after the low power magnification scan, a focus surface model is created for the high power magnification scan. Since depth of field is reduced at high power magnification, a more accurate focus surface is required. Focus pans are done in much the same manner as for the low power magnification focus surface, except that the pans are done at high power magnification. If the high power magnification surface is too variable or if too few focus pans are successful, processing of the slide ceases.

A high power magnification scan is executed after the high power magnification focus surface model has been created. During the high power magnification scan, regions of the slide identified as potentially containing abnormality during low power scan are imaged and analyzed at high power magnification. The high power magnification focus surface serves as the initial estimate of focus position for high power imaging. If the position given by the high power magnification focus surface leads to imagery which does not meet predetermined focus criterion, additional image acquisition attempts are made at the same slide region at different focus positions. If after a predetermined number of acquisition attempts, the region remains outside of the predetermined focus criterion, the slide region is abandoned. If too few slide regions are focussed adequately during the high power magnification scan, slide processing ceases. If during high power magnification scan fewer than a predetermined number of are adequately focused on first try, or too many slide regions are not focused adequately, the high power magnification focus surface model may have been inaccurate.

Image quality is checked to ensure good imagery. Image saturation, pixels with values of 0 or 255, are counted for each image. The numbers of images with saturation are counted. If too many images are saturated during either the low or high power magnification scan the optics may not be adequate for reliable specimen viewing or imaging. Additionally, if dirt obscures the optical path, imaging artifacts such as striping may be detectable on some systems. If striping is detected in more than a predetermined number of images, the slide maybe to dirty to allow accurate specimen viewing or imaging.

During evaluation, the automated system discontinues processing for slides that fall outside of an acceptable range for any of the preselected criteria. The automated system may count a proportion of slides failing processing. In one preferred embodiment, the slide set is considered to pass if the proportion of slides failing processing is less than 6%; otherwise the slide set fails.

In step 40, the automated system performs a Specimen Collection Quality Test to evaluate the quality and sufficiency of the specimen material sampled on the slide. Specimen collection quality is highly dependent upon a clinic's sampling tools and techniques for specimen collection. In the preferred embodiment, the Specimen Collection Quality Test may comprise two tests. Tables 2 and 3 list qualities for which the slide set may be tested. Slides failing these tests comprise the specimen collection quality failures. Table 2 tabulates slide set-up related failures. Table 3 tabulates failures related to process suitability failures. Process suitability failures may include, for example, slides for which process results cannot be expected to be reliable, for example, when the process detects too few reference cells. The proportion of slides failing processing for these reasons is measured. In the preferred embodiment, if the proportion of slides that failed the first test is less than 7%, the slide set is considered to pass the first test; otherwise, the slide set fails.

In the preferred embodiment, the second specimen quality test measures and ranks the reference cell ratio for all normal slides. The reference cell ratio is the number of detected reference cells ( that is, free-lying intermediate cells) on a slide divided by the number of all objects detected on the slide. In one preferred embodiment, if 85% of the normal slides have a reference cell ratio greater than 0.015, then the slide set is considered to pass the test; otherwise, the slide set fails.

The slide set is required to pass both specimen quality tests to pass the Specimen Collection Quality Test.

TABLE 2

| Lack of material in center |
| --- |
| Too few points for low-power focus map |
| Specimen distributed in small area |
| Unable to focus on specimen |
| Specimen tilt |
| Too few fields ranked in low-power scan |
| Too few points for high-power focus map |
| High-power focus surface too variable |
| Too few focused fields in high-power scan |

TABLE 3

| Insufficient reference cells |
| --- |
| Image quality not within limits, percentage of fields focused on first try. |
| Image quality not within limits, percentage of fields never focused. |

The automated system performs a Slide Handling Quality Test in step 50. The Slide Handling Quality Test determines if slide handling practices may need to be modified to facilitate effective processing on a selected automated system, such as the AutoPap® 300 System. The test evaluates the quality of slide barcoding, cleaning, and loading practices at a preselected clinical site. Tables 4 and 5 list tests for slide handling quality failures. Table 4 tabulates slide set-up related failures. Table 5 tabulates failures related to image processing methods suitability failures. The system measures the proportion of slides failing these tests. In the preferred embodiment, if the proportion of slides that failed is less than 5%, the slide set is considered to pass the slide handling quality test; otherwise, the slide set fails.

TABLE 4

Slide barcode not read
Slide tilted

TABLE 5

Image quality not within limits, excessive striping.
Image quality not within limits, high power magnification image saturation (small amounts)
Image quality not within limits, high power magnification image saturation (large amounts)
Image quality not within limits, low power magnification image saturation.

The automated system performs a Preparation Quality Test in step 60. The Preparation Quality Test evaluates the result of laboratory fixation, staining, and coverslipping processes to see if the presentation of cells is within an acceptable range. In the preferred embodiment, five tests comprise preparation quality test—to pass the full test, the slide set must pass all tests. Referring to Tables 6 and 7, slides which fail processing for the tabulated reasons comprise the preparation quality failures.

Cytoplasm stain density is measured. If the cytoplasm stain measure outside of predetermined limits, the automated device may not accurately score the slide. The slide is called unsuitable for image processing methods.

Also the contrast between reference cell nuclei and cytoplasm. If this contrast measure is outside of predetermined limits the slide is called unsuitable for image processing methods of the device.

The proportion of slides failing processing for these reasons is measured. Table 6 tabulates slide set-up related failures. Table 7 tabulates failures related to image processing methods suitability failures. In the preferred embodiment, if the proportion of slides that failed the first test is less than 5%, the slide set passes the first test; otherwise, the slide set fails.

TABLE 6

Too many bubbles
Too few fields ranked in low-power scan

TABLE 7

Stain average not within limits
Cytoplasm Staining not within limits
Staining detail not within limits
Nuclear/Cytoplasm contrast not within limits
Insufficient reference cells
Image quality not within limits, high power magnification image saturation (large amounts)
Image quality not within limits, low power magnification image saturation.

The second preparation quality test measures the nuclear stain density of the reference cells detected on the slide. Measurements are stored in a "mean stain" bin. The mean optical density for each detected intermediate cell nucleus is calculated. Data for all the detected intermediate cell nuclei on the slide is accumulated in a 10-bin histogram. The average staining score for the normal slides is calculated. In the preferred embodiment, if the average staining score is greater than 4.2 and less than 6.4, the slide set passes the test; otherwise, the slide set fails.

The third preparation quality test counts the number of potentially abnormal cell nuclei detected on a slide (stage 3 abnormals). The 80th percentile of the normal slides which contain endocervical component cells is calculated. In the preferred embodiment, if the 80th percentile is greater than 3, the slide set passes the test; otherwise, the slide set fails.

The fourth preparation quality test measures the 80th percentile of the QC score of the normal slides which contain endocervical component cells. In the preferred embodiment, if the 80th percentile is greater than 0.15 and less than 0.6, the slide set passes the test; otherwise, the slide set fails.

The fifth preparation quality test measures the median of reference cell nuclear texture (nuclear blur average) for the normal slides which contain endocervical component cells. In the preferred embodiment, if the median is greater than 5.65, the slide set passes the test; otherwise, the slide set fails.

In step 70, the automated system performs a Classification Test. The Classification Test evaluates whether the customer slide and cell presentation are within the training range of the AutoPap® 300 System to enable an effective interpretation by the system. The test evaluates the accuracy of slide classifications.

The system accuracy test evaluates sensitivity to abnormal specimen morphology. The 80th percentile of the QC score of the normal slides is calculated. In the preferred embodiment, if more than 70% of the low grade slides and 80% of the high grade slides have QC scores above the 80th percentile for normal slides, the slide set passes the test; otherwise, the slide set fails.

In step 80, the automated system then integrates the results from the tests in steps 30–70. In the preferred embodiment, the slide set must pass each test or the slide set is considered to fail. If the slide set passes, the test result integration in states that the slide set is acceptable in step 90. If the slide set fails, the test result integration makes recommendations for adjustment of the laboratory or clinic process in step 100.

Figure 3B:
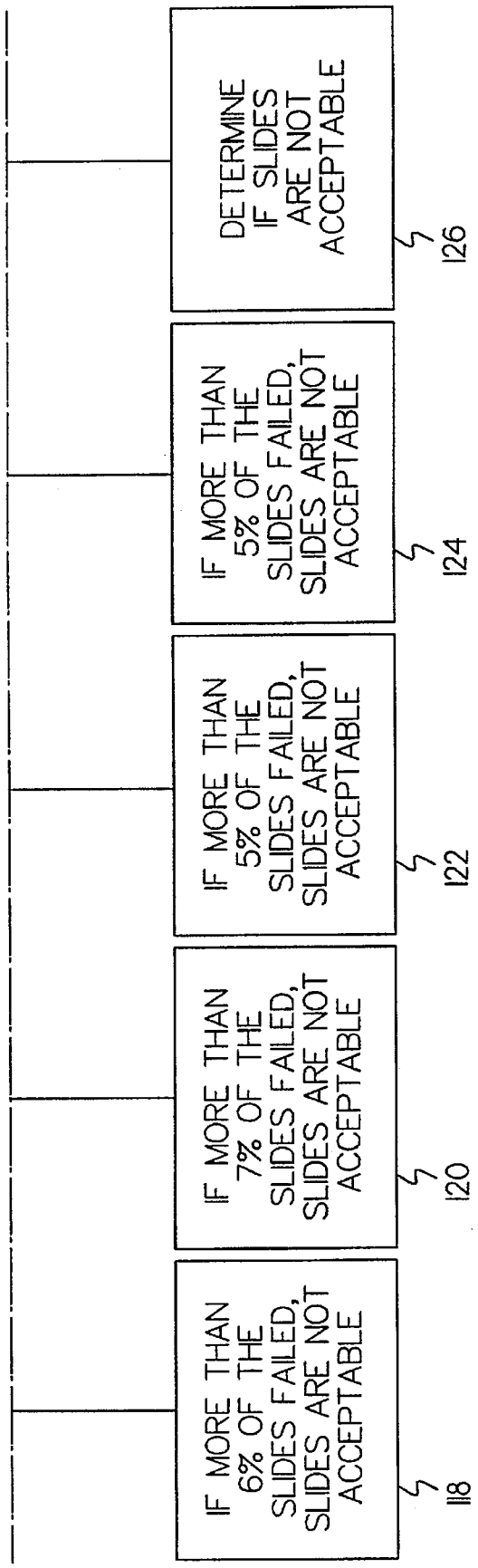
FIG. 3 is a flow chart of a method for assessing slide and specimen preparation quality.

Now referring to FIG. 3, FIG. 3 shows a more detailed flow chart of the method for assessing slide and specimen preparation quality of the invention. In one embodiment of the invention slides are collected at step 103. At process step 104 the collected slides are cleaned and a barcode is affixed to the slides. At process step 106 the slides are processed in accordance with the various quality control methods described herein. Processing includes process steps 108 through process step 126 as shown in FIG. 3 and as described with reference to the tables hereinbelow. At process step 108 a percentage of slides is determined as failing quality control processing for physical characteristics. At process step 118 slides are determined to be unacceptable as failing quality control processing for physical characteristics if more than 6% of the slides failed this test. At process step 110 a percentage of slides is determined as failing quality control processing for specimen collection characteristics. At process step 120 slides are determined to be unacceptable as failing quality control processing for specimen collection characteristics if more than 7% of the slides failed this test. At process step 112 a percentage of slides is determined as failing quality control processing for slide handling quality characteristics. At process step 122 slides are determined to be unacceptable as failing quality control processing for slide handling quality characteristics if more than 5% of the slides failed this test. At process step 114 a percentage of slides is determined as failing quality control processing for specimen preparation characteristics. At process step 124 slides are determined to be unacceptable as failing quality control processing for specimen quality characteristics if more than 5% of the slides failed this test. At process step 116 a percentage of abnormal slides is determined as scoring higher than the 80th percentile of normal specimens. At process step 126 slides are determined to be not acceptable if fewer than 70% of the low grade slides or fewer than 80% of the high grade slides have scores higher than the 80th percentile of normal specimens.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for testing a slide set for slide and specimen preparation quality comprising the steps of:
    a) evaluating slide and specimen preparation quality for a slide in the slide set to produce an evaluation, wherein the step of evaluating slide and specimen preparation quality further comprises evaluating physical characteristics of the slide; and
    b) determining the slide and specimen preparation quality of the slide set based on the evaluation.

2. The method of claim 1 wherein the step of evaluating physical characteristics of a slide further comprises the step of making at least one measurement of slide dimension.

3. The method of claim 1 wherein the step of evaluating physical characteristics of a slide further comprises checking of at least one surface characteristic of a slide coverslip.

4. The method of claim 1 wherein the step of evaluating physical characteristics of a slide further comprises checking whether a length of a slide coverslip is within a set of predetermined limits.

5. The method of claim 1 wherein the step of evaluating physical characteristics of a slide further comprises checking whether a width of a slide coverslip is within predetermined limits.

6. The method of claim 1 wherein the step of evaluating physical characteristics of a slide further comprises checking whether a coverslip area is within predetermined limits.

7. The method of claim 1 wherein the step of evaluating physical characteristics of a slide further comprises checking whether at least one specimen to coverslip top distance is less than a predetermined amount.

8. The method of claim 1 wherein the step of evaluating physical characteristics of a slide further comprises checking whether at least one specimen to coverslip top distance is greater than a predetermined amount.

9. The method of claim 1 wherein the step of evaluating physical characteristics of a slide further comprises checking at least one geometric property of the slide.

10. The method of claim 1 wherein the step of evaluating physical characteristics of a slide further comprises checking whether slide coverslip corners are square to within predetermined limits.

11. The method of claim 1 wherein the step of evaluating physical characteristics of a slide further comprises checking whether a slide coverslip is skewed on the slide more than a predetermined limit.

12. The method of claim 2 wherein the slide is viewed by an automated system having an imager, wherein the imager is capable of focusing on a specimen, the method further including the step of checking whether the imager has focused on the specimen to a predetermined degree of accuracy.

13. The method of claim 1 wherein the step of evaluating slide and specimen preparation quality further comprises evaluating specimen material quality.

14. The method of claim 13 wherein the step of evaluating specimen material quality further comprises the steps of:
    a) checking for slide setup related failures; and
    b) checking for process suitability failures.

15. The method of claim 13 wherein the step of evaluating specimen material quality further comprises checking for a lack of viewable specimen material in a predetermined central region of a slide.

16. The method of claim 13 wherein the step of evaluating specimen material quality further comprises the step of checking whether there are fewer than a predetermined number of points to focus successfully at low power magnification to create a low power magnification focus surface model.

17. The method of claim 1 wherein the step of evaluating slide and specimen preparation quality further comprises the steps of:
    a) testing for preparation quality failures; and
    b) testing for slide analysis suitability failures.

18. The method of claim 17 wherein the step of testing for slide analysis suitability failures further comprises the step of counting a number of reference cells and determining if the number of reference cells are within predetermined limits.

19. The method of claim 17 wherein the step of testing for slide analysis suitability failures further comprises the step of checking image saturation.

20. The method of claim 19 wherein the step of checking image saturation further comprises the step of checking image quality for high power magnification image saturation greater than a predetermined amount.

21. The method of claim 19 wherein the step of checking image saturation further comprises the step of checking image quality for low power magnification image saturation greater than a predetermined amount.

22. The method of claim 1 wherein at least one parameter is measured further comprising the step of determining whether at least one parameter is within predetermined limits.

23. A method for testing a slide set for slide and specimen preparation quality comprising the steps of:
    a) evaluating slide and specimen preparation quality for a slide in the slide set to produce an evaluation, wherein the step of evaluating slide and specimen quality further comprises evaluating handling quality of the slide; and
    b) determining the slide and specimen preparation quality of the slide set based on the evaluation.

24. The method of claim 23 wherein the step of evaluating handling quality of the slide further comprises the steps of:
    a) checking slide setup related failures; and
    b) checking slide analysis suitability failures.

25. The method of claim 24 wherein the step of checking slide setup related failures further comprises the steps of:
    a) checking whether a barcode of a slide was read correctly; and
    b) checking whether the slide is tilted greater than a predetermined degree.

26. The method of claim 24 wherein the step of checking slide analysis suitability failures further comprises the steps of:

a) checking an image quality of the slide for more than a predetermined amount of striping; and b) checking for more than a predetermined amount of image saturation.

27. The method of claim 26 wherein the step of checking image saturation further comprises step of checking image quality of the slide for high power magnification image saturation greater than a first predetermined amount.

28. The method of claim 26 wherein the step of checking image saturation further comprises the step of checking image quality of the slide for high power magnification image saturation greater than a second predetermined amount.

29. The method of claim 26 wherein the step of checking image saturation further comprises the step of checking image quality of the slide for low power magnification image saturation greater than a predetermined amount.

30. A method for testing a slide set for slide and specimen preparation quality comprising the steps of:

a) evaluating slide and specimen preparation quality for a slide in the slide set to produce an evaluation of specimen material quality, wherein the step of evaluating specimen material quality further comprises the step of checking whether a distribution of viewable specimen material on the slide meets predetermined criteria; and b) determining the slide and specimen preparation quality of the slide set based on the evaluation.

31. A method for testing a slide set for slide and specimen preparation quality, and wherein the slide is viewed by an automated system having an imager, and wherein the imager is capable of focusing on a specimen, the method comprising the steps of:

a) evaluating slide and specimen preparation quality for a slide in the slide set to produce an evaluation of specimen material quality, and wherein the step of evaluating specimen material quality further comprises the step of checking whether the automated system has successfully focused on more than a predetermined number of regions of the specimen; and b) determining the slide and specimen preparation quality of the slide set based on the evaluation.

32. A method for testing a slide set for slide and specimen preparation quality comprising the steps of:

a) evaluating slide and specimen preparation quality for a slide in the slide set to produce an evaluation of specimen material quality, wherein the step of evaluating specimen material quality further comprises the step of checking whether a specimen is tilted more than a predetermined degree; and b) determining the slide and specimen preparation quality of the slide set based on the evaluation.

33. A method for testing a slide set for slide and specimen preparation quality comprising the steps of:

a) evaluating slide and specimen preparation quality for a slide in the slide set to produce an evaluation of specimen material quality, wherein the step of evaluating specimen material quality further comprises the step of checking whether there are fewer than a predetermined number of fields ranked after a low power magnification scan; and b) determining the slide and specimen preparation quality of the slide set based on the evaluation.

34. A method for testing a slide set for slide and specimen preparation quality comprising the steps of:

a) evaluating slide and specimen preparation quality for a slide in the slide set to produce an evaluation of specimen material quality, wherein the step of evaluating specimen material quality further comprises the step of checking whether there are fewer than a predetermined number of points for a high power magnification focus surface model to be created; and b) determining the slide and specimen preparation quality of the slide set based on the evaluation.

35. A method for testing a slide set for slide and specimen preparation quality comprising the steps of:

a) evaluating slide and specimen preparation quality for a slide in the slide set to produce an evaluation of specimen material quality wherein the step of evaluating specimen material quality further comprises the step of checking whether a high power focus surface is more variable than a predetermined amount; and b) determining the slide and specimen preparation quality of the slide set based on the evaluation.

36. A method for testing a slide set for slide and specimen preparation quality comprising the steps of:

a) evaluating slide and specimen preparation quality for a slide in the slide set to produce an evaluation of specimen material quality wherein the step of evaluating specimen material quality further comprises the step of checking whether there are fewer than a predetermined number of focused fields in a high power scan; and b) determining the slide and specimen preparation quality of the slide set based on the evaluation of the slide.

37. A method for testing a slide set for slide and specimen preparation quality comprising the steps of:

evaluating slide and specimen preparation quality for a slide in the slide set to produce an evaluation of specimen material quality wherein the step of evaluating specimen material quality further comprises the step of checking whether there are fewer than a predetermined number of reference cells; and b) determining the slide and specimen preparation quality of the slide set based on the evaluation.

38. A method for testing a slide set for slide and specimen preparation quality comprising the steps of:

a) evaluating slide and specimen preparation quality for a slide in the slide set to produce an evaluation by testing for preparation quality failures wherein the step of testing for preparation quality failures further comprises the step of checking for more bubble area on the slide than a predetermined amount b) determining the slide and specimen preparation quality of the slide set based on the evaluation.

39. A method for testing a slide set for slide and specimen preparation quality comprising the steps of:

a) evaluating slide and specimen preparation quality for a slide in the slide set to produce an evaluation by testing for preparation quality failures wherein the step of testing for preparation quality failures further comprises the step of checking staining quality; and b) determining the slide and specimen preparation quality of the slide set based on the evaluation.

40. The method of claim 39 wherein the step of checking staining quality further comprises checking whether nuclear staining average is within predetermined limits.

41. The method of claim 39 wherein the step of checking staining quality further comprises checking whether cytoplasm staining is within predetermined limits.

42. The method of claim 39 wherein the step of checking staining quality further comprises nuclear staining detail is within predetermined limits.

43. The method of claim 39 wherein the step of checking staining quality further comprises checking whether nuclear-cytoplasm contrast is within predetermined limits.

44. A method for testing a slide set for slide and specimen preparation quality comprising the steps of:
   a) evaluating slide and specimen preparation quality for a slide in the slide set to produce an evaluation where at least one parameter is measured, further comprising the step of determining whether the at least one parameter is within a training range of a preselected automated system; and
   b) determining the slide and specimen preparation quality of the slide set based on the evaluation.

45. An apparatus for analyzing slide and specimen preparation quality for a population of slides comprising:
   a) an image gathering means for obtaining image data, wherein the image data is representative of the population of slides;
   b) a means for calculating at least one slide quality measurement connected to receive the image data, having a slide quality data output and further comprising a means for testing slide physical characteristics connected to receive the image data and providing a slide physical characteristics data output connected to the slide quality data output; and
   c) a data processing system connected to receive and integrate the slide quality data output wherein the data processing system provides a population suitability data output.

46. The apparatus of claim 45 wherein the means for calculating at least one slide quality measurement comprises a means for testing specimen material quality connected to receive the image data and providing a specimen material quality data output connected to the slide quality data output.

47. The apparatus of claim 45 wherein the image gathering means further comprises an automated microscope.

48. An apparatus for analyzing slide and specimen preparation quality for a population of slides comprising:
   a) an image gathering means for obtaining image dam, wherein the image data is representative of the population of slides;
   b) a means for calculating at least one slide quality measurement connected to receive the image data, having a slide quality data output further comprising a means for testing slide handling quality connected to receive the image data and providing a slide handling quality data output connected to the slide quality data output; and
   c) a data processing system connected to receive and integrate the slide quality data output wherein the data processing system provides a population suitability data output.

49. An apparatus for analyzing slide and specimen preparation quality for a population of slides comprising:
   a) an image gathering means for obtaining image data, wherein the image data is representative of the population of slides;
   b) a means for calculating at least one slide quality measurement connected to receive the image data, having a slide quality data output further comprising a means for testing system accuracy connected to receive the image data and providing a system accuracy data output connected to the slide quality data output; and
   c) a data processing system connected to receive and integrate the slide quality data output wherein the dam processing system provides a population suitability data output.

50. An apparatus for analyzing slide and specimen preparation quality for a population of slides comprising:
   a) an image gathering means for obtaining image data, wherein the image data is representative of the population of slides;
   b) a means for calculating at least one slide quality measurement connected to receive the image data, having a slide quality data output; and
   c) a data processing system connected to receive and integrate the slide quality data output wherein the data processing system provides a population suitability data output further comprising a means for providing a recommendation for changes in slide handling techniques.

51. An apparatus for analyzing slide and specimen preparation quality for a population of slides comprising:
   a) an image gathering means for obtaining image data, wherein the image data is representative of the population of slides;
   b) a means for calculating at least one slide quality measurement connected to receive the image data, having a slide quality data output; and
   c) a data processing system connected to receive and integrate the slide quality data output wherein the data processing system provides a population suitability data in specimen preparation techniques output further comprising a means for providing a recommendation for changes in specimen preparation techniques.

52. A method for testing a slide set for slide and specimen preparation quality comprising the steps of:
   a) evaluating slide and specimen preparation quality for a slide in the slide set to produce an evaluation of specimen material quality by checking whether there is less than a predetermined percentage of fields focused on an at least one initial try; and
   b) determining the slide and specimen preparation quality of the slide set based on the evaluation.

53. A method for testing a slide set for slide and specimen preparation quality comprising the steps of:
   a) evaluating slide and specimen preparation quality for a slide in the slide set to produce an evaluation of specimen material quality by checking whether there is more than a predetermined percentage of fields never focused; and
   b) determining the slide and specimen preparation quality of the slide set based on the evaluation.

54. A method for testing a slide set for slide and specimen preparation quality comprising the steps of:
   a) evaluating slide and specimen preparation quality for a slide in the slide set to produce an evaluation by testing for preparation quality failures by checking for fewer fields with sufficient ranking after a low power magnification scan than a predetermined amount; and
   b) determining the slide and specimen preparation quality of the slide set based on the evaluation of the slide.

* * * * *

UNITED STATES PATENT AND TRADEMARK OFFICE
CERTIFICATE OF CORRECTION

PATENT NO. : 5,671,288
DATED : September 23, 1997
INVENTOR(S) : Wilhelm et al.

It is certified that error appears in the above-identified patent and that said Letters Patent is hereby corrected as shown below:

Column 3, line 6, delete "et at" and replace it with -- et al --.

Column 3, line 13, delete "et at" and replace it with -- et al --.

Column 3, line 21, delete "et at" and replace it with -- et al --.

Column 3, line 46, delete "et at" and replace it with -- et al --.

Column 3, line 48, delete "et at" and replace it with -- et al --.

Column 3, line 51, delete "Rosen of" and replace it with -- Rosenlof --.

Column 3, line 58, delete "et at" and replace it with -- et al --.

Column 3, line 61, delete "et at" and replace it with -- et al --.

Column 4, line 1, delete "et at" and replace it with -- et al --.

Column 5, Table 1, last line, delete "anci" and replace it with -- and --.

Column 11, line 42, delete "envisions" and replace it with -- envisioned --.

Column 15, line 51, after the word "of" insert the phrase -- slide regions --.

Column 15, line 64, delete "maybe to" and replace it with -- may be too --.

Column 18, line 35, after the word "integration" delete the word "in".

Column 18, line 45, delete "With" and replace it with -- with --.

UNITED STATES PATENT AND TRADEMARK OFFICE
CERTIFICATE OF CORRECTION

PATENT NO. : 5,671,288
DATED : September 23, 1997
INVENTOR(S) : Wilhelm et al.

It is certified that error appears in the above-identified patent and that said Letters Patent is hereby corrected as shown below:

In the Claims

Column 19, line 65 (Claim 12), delete number "2" and replace it with -- 1 --.

Column 22, line 32 (Claim 37), before the word "evaluating" insert -- a) --.

Column 23, line 40 (Claim 48), delete "dam" and replace it with -- data -- .

Column 24, line 2 (Claim 49), delete "dam" and replace it with -- data -- .

Column 24, line 33 (Claim 51), delete the phrase "in specimen preparation techniques".

Signed and Sealed this

Second Day of February, 1999

Attest:

Attesting Officer

*Acting Commissioner of Patents and Trademarks*